(12) United States Patent
Nomura et al.

(10) Patent No.: US 8,107,004 B2
(45) Date of Patent: Jan. 31, 2012

(54) IMAGING DEVICE

(75) Inventors: Hiroshi Nomura, Saitama (JP); Isao Okuda, Saitama (JP); Eijiroh Tada, Saitama (JP); Atsumi Kaneko, Tokyo (JP)

(73) Assignee: Hoya Corporation, Tokyo (JP)

( * ) Notice: Subject to any disclaimer, the term of this patent is extended or adjusted under 35 U.S.C. 154(b) by 953 days.

(21) Appl. No.: 12/036,486

(22) Filed: Feb. 25, 2008

(65) Prior Publication Data
US 2008/0225139 A1    Sep. 18, 2008

(30) Foreign Application Priority Data

Feb. 26, 2007  (JP) .................................. 2007-45821
Apr. 9, 2007   (JP) .................................. 2007-101293
Feb. 21, 2008  (JP) .................................. 2008-39524
Feb. 21, 2008  (JP) .................................. 2008-39525

(51) Int. Cl.
*H04N 5/225* (2006.01)
(52) U.S. Cl. .......................... 348/374; 348/335; 348/337
(58) Field of Classification Search .................... 348/374
See application file for complete search history.

(56) References Cited

U.S. PATENT DOCUMENTS

| | | | |
|---|---|---|---|
| 6,498,624 | B1 | 12/2002 | Ogura et al. |
| 6,992,699 | B1 * | 1/2006 | Vance et al. ............. 348/207.99 |
| 7,352,405 | B2 * | 4/2008 | Miyahara et al. ............. 348/374 |
| 7,605,864 | B2 * | 10/2009 | Takahashi et al. ............ 348/374 |
| 7,701,505 | B2 * | 4/2010 | Kikuchi ........................ 348/374 |
| 2003/0128283 | A1 * | 7/2003 | Watanabe et al. ........... 348/231.9 |
| 2003/0219244 | A1 * | 11/2003 | Suh ................................ 396/85 |
| 2004/0095501 | A1 | 5/2004 | Aizawa et al. |
| 2004/0263668 | A1 * | 12/2004 | Kim et al. ..................... 348/340 |
| 2006/0056829 | A1 | 3/2006 | Hirota et al. |
| 2006/0092524 | A1 | 5/2006 | Konno |
| 2006/0291075 | A1 | 12/2006 | Nomura et al. |
| 2007/0019084 | A1 | 1/2007 | Nomura et al. |
| 2007/0019304 | A1 | 1/2007 | Nomura |
| 2007/0077047 | A1 | 4/2007 | Nomura et al. |
| 2007/0097219 | A1 | 5/2007 | Nomura et al. |

FOREIGN PATENT DOCUMENTS

| | | |
|---|---|---|
| JP | 11-17996 | 1/1999 |
| JP | 2003-5267 | 1/2003 |
| JP | 2006-78891 | 3/2006 |

OTHER PUBLICATIONS

English language Abstract of JP 2003-5267.
English language Abstract of JP 11-17996.
English language Abstract of JP 2006-78891.
China Office action, dated Nov. 11, 2010 along with an english translation thereof.

* cited by examiner

*Primary Examiner* — Anthony J Daniels
(74) *Attorney, Agent, or Firm* — Greenblum & Bernstein, P.L.C.

(57) ABSTRACT

An imaging device includes an imaging optical system including at least one movable optical element; an image sensor, an imaging surface of which lies on an image-forming plane of the imaging optical system; a circuit board on which the image sensor is mounted; and an image processing circuit for processing an image signal output from the image sensor and a drive circuit for the movable optical element, both of the image processing circuit and the drive circuit are mounted on the circuit board. The image processing circuit and the drive circuit are disposed on the circuit board in that order from a side closer to the image sensor.

11 Claims, 15 Drawing Sheets

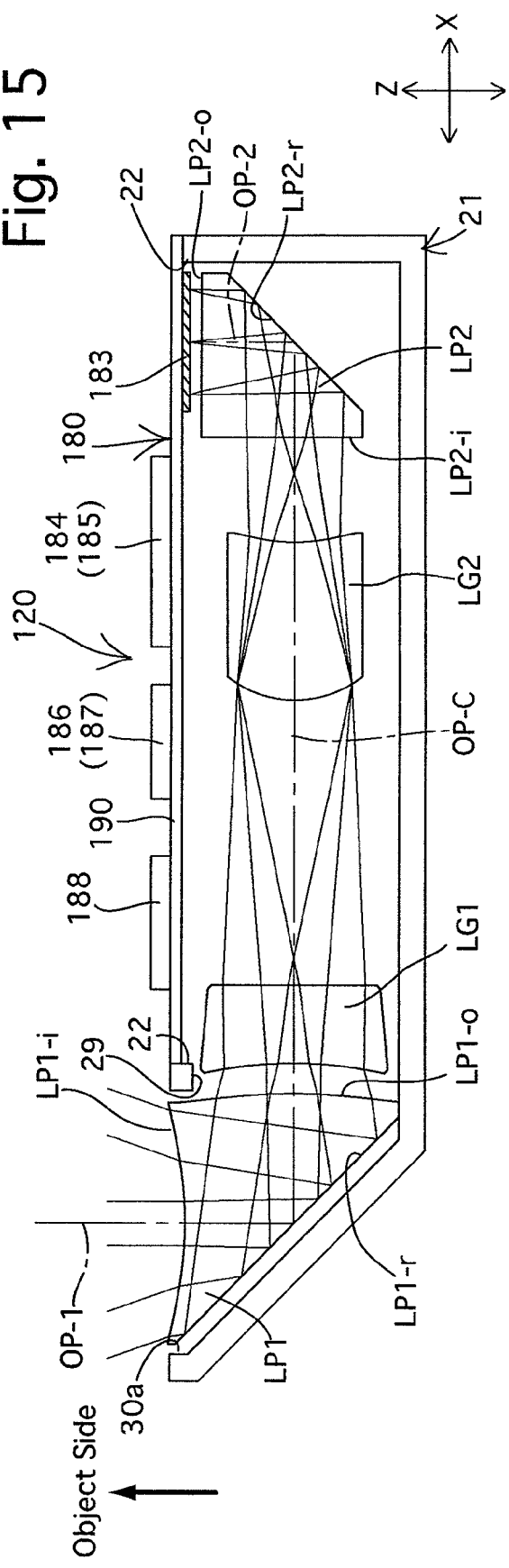

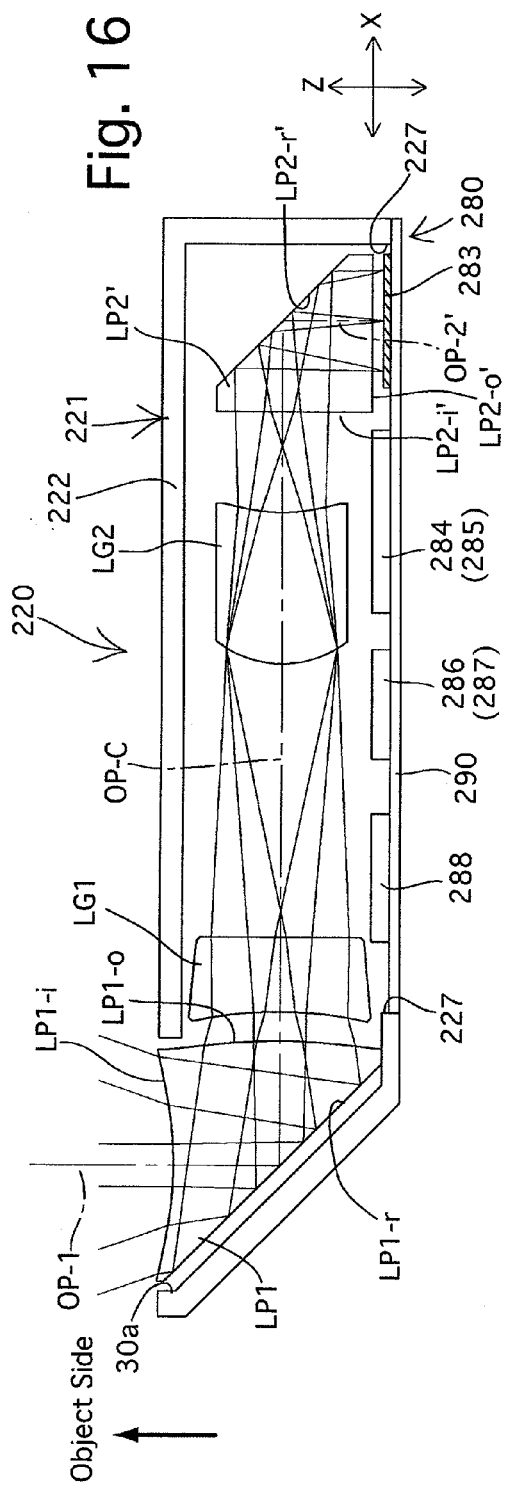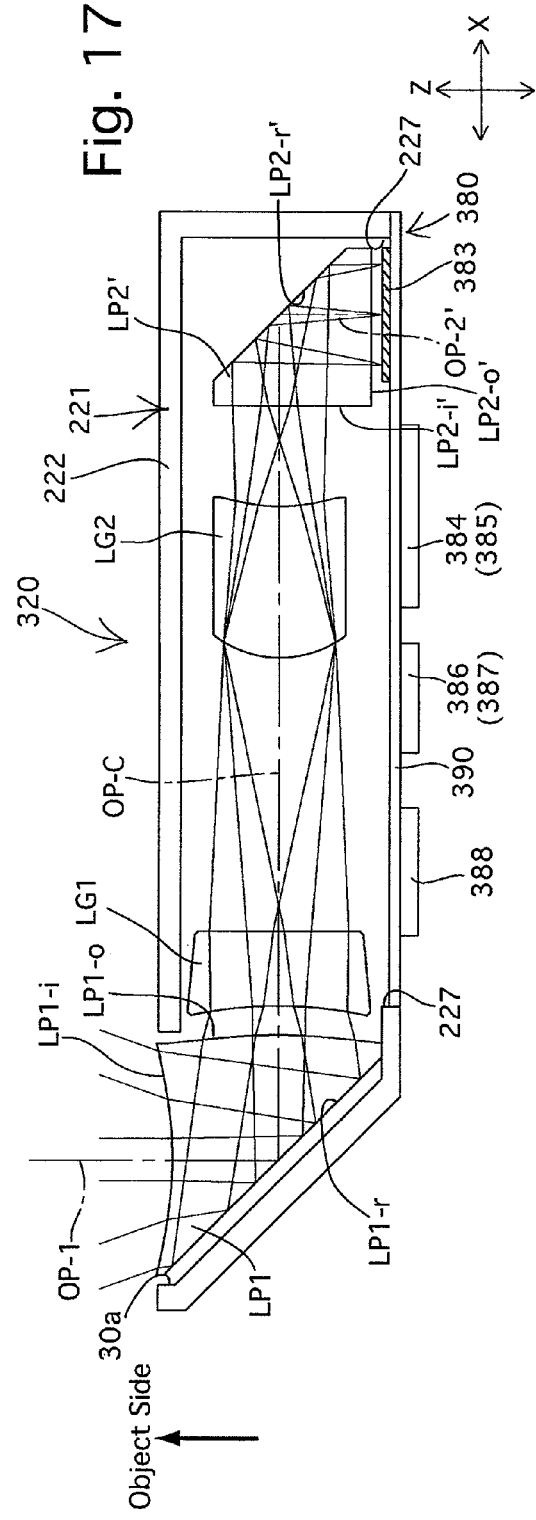

IMAGING DEVICE

BACKGROUND OF THE INVENTION

1. Field of the Invention

The present invention relates to an imaging device which includes at least one movable optical element and an image sensor, and in particular relates to the structure of a circuit board of such an imaging device.

2. Description of the Related Art

In recent years, imaging devices using an image sensor such as a CCD sensor or a CMOS sensor as an image pickup device instead of sliver-salt film have been in widespread use. Furthermore, a type of imaging device in which a part of the optical elements of an imaging optical system is moved to perform a zooming operation or a focusing operation has also been in widespread use.

However, to improve portability of an electronic device (e.g., a digital camera, a mobile phone, etc.) incorporating such a type of imaging device, there has been a high demand for miniaturization of the imaging device. On the other hand, an imaging device which includes at least one movable optical element is subject to constraints to miniaturization of the optical system provided in the imaging device because an internal space allowing the movable optical element to move needs to be provided. In addition, in the case where an imaging device has such a movable optical element, the drive circuit for the movable optical element may become a source of noise which interferes with signals of picture images, and also the relative position between the drive circuit and the image sensor is subject to some constraints in order to maintain favorable image quality. In other words, it is unfavorable that the drive circuit and the image sensor be positioned too close to each other. Due to such problems, in the type of imaging device which contains an image sensor and at least one movable optical element in particular, it has been difficult to attain a balance between obtaining high-quality images with less noise and miniaturization/simplification of the structure. Conventional imaging devices (for example, Japanese Unexamined Patent Publication 2006-78891, and Japanese Unexamined Patent Publication 2003-5267) are not designed with consideration of both miniaturization and noise-reduction control.

SUMMARY OF THE INVENTION

In view of the above described problems which reside in conventional imaging devices, the present invention provides an imaging device which can achieve a high level of image quality with a low level of noise and which is also simple and compact in structure.

According to an aspect of the present invention, an imaging device is provided, including an imaging optical system including at least one movable optical element; an image sensor, an imaging surface of which lies on an image-forming plane of the imaging optical system; a circuit board on which the image sensor is mounted; and an image processing circuit for processing an image signal output from the image sensor and a drive circuit for the movable optical element, both of the image processing circuit and the drive circuit are mounted on the circuit board. The image processing circuit and the drive circuit are disposed on the circuit board in that order from a side closer to the image sensor.

It is desirable for a distance between the image processing circuit and the drive circuit on the circuit board to be greater than a distance between the image sensor and the image processing circuit on the circuit board.

It is desirable for the movable optical element to be movable in a direction of a primary optical axis of the imaging optical system. The imaging optical system includes an incident-side prism and an exit-side prism which are disposed at opposite ends of the primary optical axis to bend the opposite ends of the primary optical axis at right angles, respectively. The circuit board is parallel to the primary optical axis, includes the image sensor on a surface of the circuit board which faces an exit surface of the exit-side prism, and further includes the drive circuit so that the drive circuit is positioned in a close vicinity of the incident-side prism.

It is desirable for the imaging optical system to be a zoom optical system, and for the movable optical element to be a lens group which moves along the primary optical axis to vary the focal length of the zoom optical system.

It is desirable for the imaging device to include circuit parts disposed in an area of the circuit board between the image processing circuit and the drive circuit.

It is desirable for the circuit board to be a rigid board.

It is desirable for the circuit board to be a multi-layer wiring board.

It is desirable for the image sensor and the drive circuit to be disposed on the circuit board at opposite ends of the circuit board in a lengthwise direction thereof, respectively.

In an embodiment, an imaging device is provided, including an imaging optical system and an image sensor, an imaging surface of the image sensor lying on an image-forming plane of the imaging optical system, the imaging optical system including at least one movable optical element movable along a primary optical axis of the imaging optical system; and an exit portion from which light passed through the movable optical element exits along an exit optical axis substantially orthogonal to the primary optical axis. The image sensor is mounted on a circuit board substantially parallel to the primary optical axis at one of opposite ends of the circuit board in a direction of the primary optical axis to face the exit portion of the imaging optical system. The imaging device further includes a drive circuit provided for the movable optical element and mounted on the circuit board at the other end the opposite ends of the circuit board in the direction of the primary optical axis, and an image processing circuit provided for processing an image signal output from the image sensor and mounted on the circuit board between the image sensor and the drive circuit to be positioned closer to the image sensor than the drive circuit in the direction of the primary optical axis.

In an embodiment, an imaging device is provided, including an imaging optical system including at least one movable optical element; an image sensor, an imaging surface of which lies on an image-forming plane of the imaging optical system; and a circuit board on which the image sensor is mounted. Each of the image sensor and the circuit board is substantially rectangular in shape. The image sensor is disposed on the circuit board so that a lengthwise direction of the image sensor is substantially orthogonal to a lengthwise direction of the circuit board. An image processing circuit for processing an image signal output from the image sensor and a drive circuit for the movable optical element are disposed on the circuit board in an area thereof adjacent to one of long sides of the image sensor.

According to the present invention, an imaging device which can achieve a high level of image quality with a low level of noise and is also simple and compact in structure.

The present disclosure relates to subject matter contained in Japanese Patent Applications Nos. 2007-45821 (filed on Feb. 26, 2007), 2007-101293 (filed on Apr. 9, 2007), 2008-

39524 (filed on Feb. 21, 2008) and 2008-39525 (filed on Feb. 21, 2008) which are expressly incorporated herein by reference in their entireties.

BRIEF DESCRIPTION OF THE DRAWINGS

The present invention will be described below in detail with reference to the accompanying drawings in which:

FIG. 15 is a cross sectional view of another embodiment of the imaging unit in which the electronic circuit parts on the cover board except the image sensor are mounted to the outer surface of the cover board, in contrast to the electronic circuit parts shown in FIG. 11;

FIG. 16 is a cross sectional view of another embodiment of the imaging unit in which the cover board is fixed to the back side of the housing with the direction of reflection of the second prism being inverted so that the second prism reflects the incident light in the direction opposite to the direction of reflection of the second prism shown in FIG. 11;

FIG. 17 is a cross sectional view of another embodiment of the imaging unit in which the electronic circuit parts on the cover board except the image sensor are mounted to the outer surface of the cover board, in contrast to the electronic circuit parts shown in FIG. 16.

DESCRIPTION OF THE PREFERRED EMBODIMENTS

Figure 1:
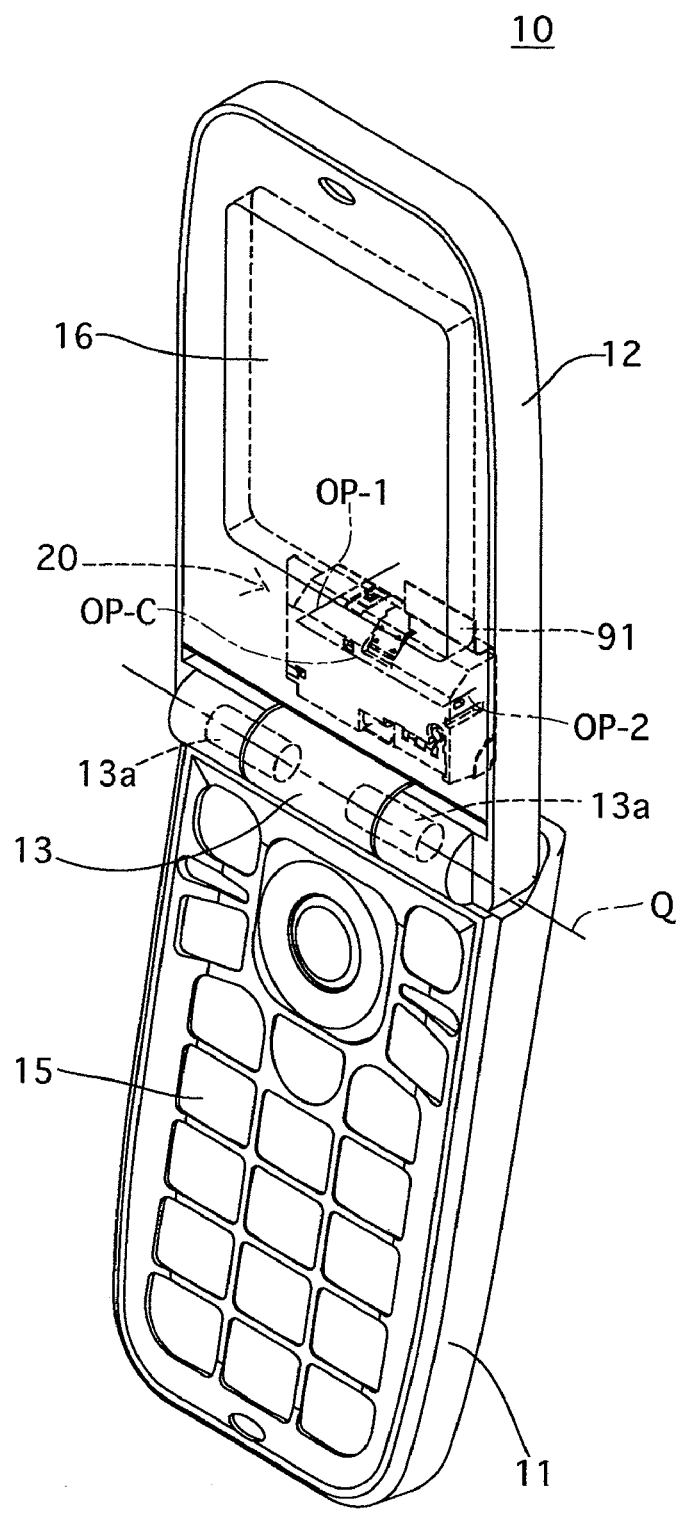
FIG. 1 is a perspective view of a folding type of mobile phone in which an imaging unit according to the present invention is incorporated, showing a fully open state (unfolded state) of the mobile phone.
Figure 2:
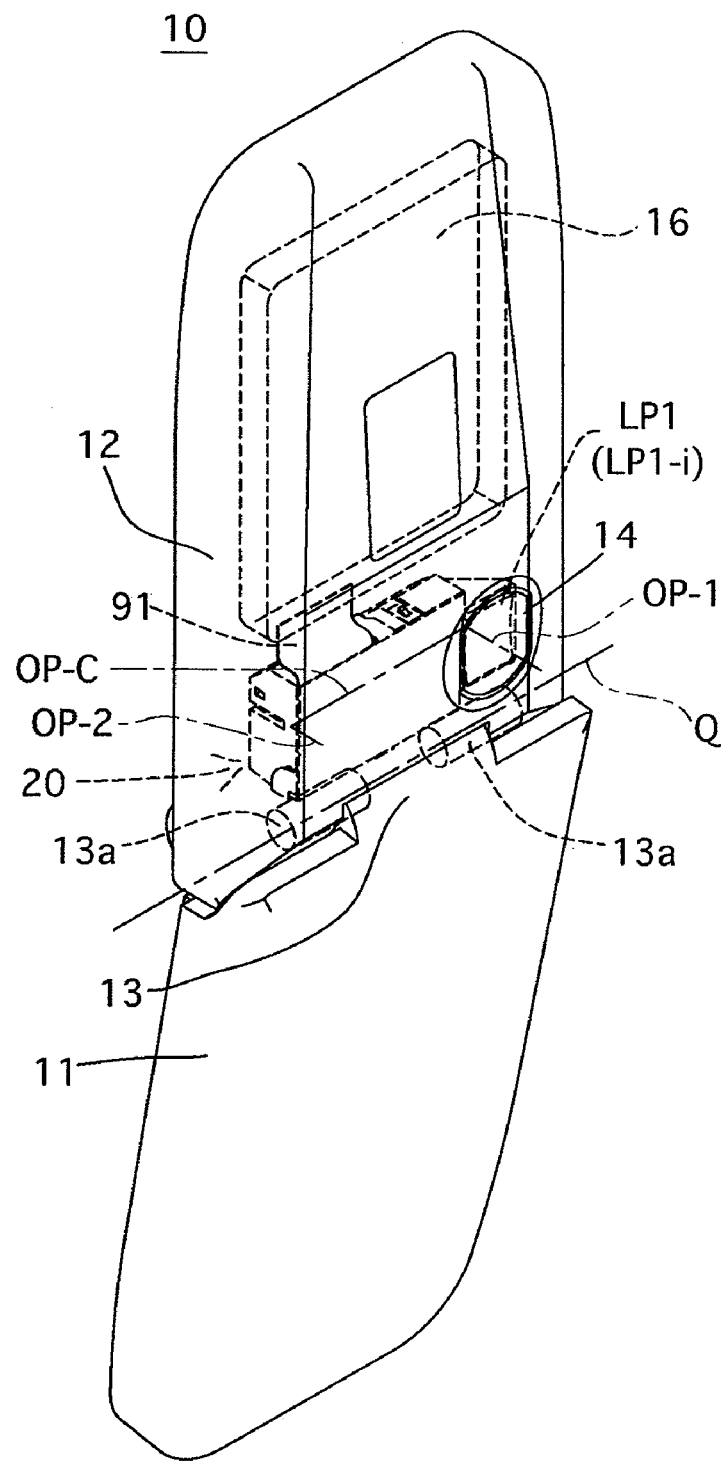
FIG. 2 is a perspective view of the mobile phone shown in FIG. 1, viewed from the other side of the mobile phone shown in FIG. 1.
Figure 3:
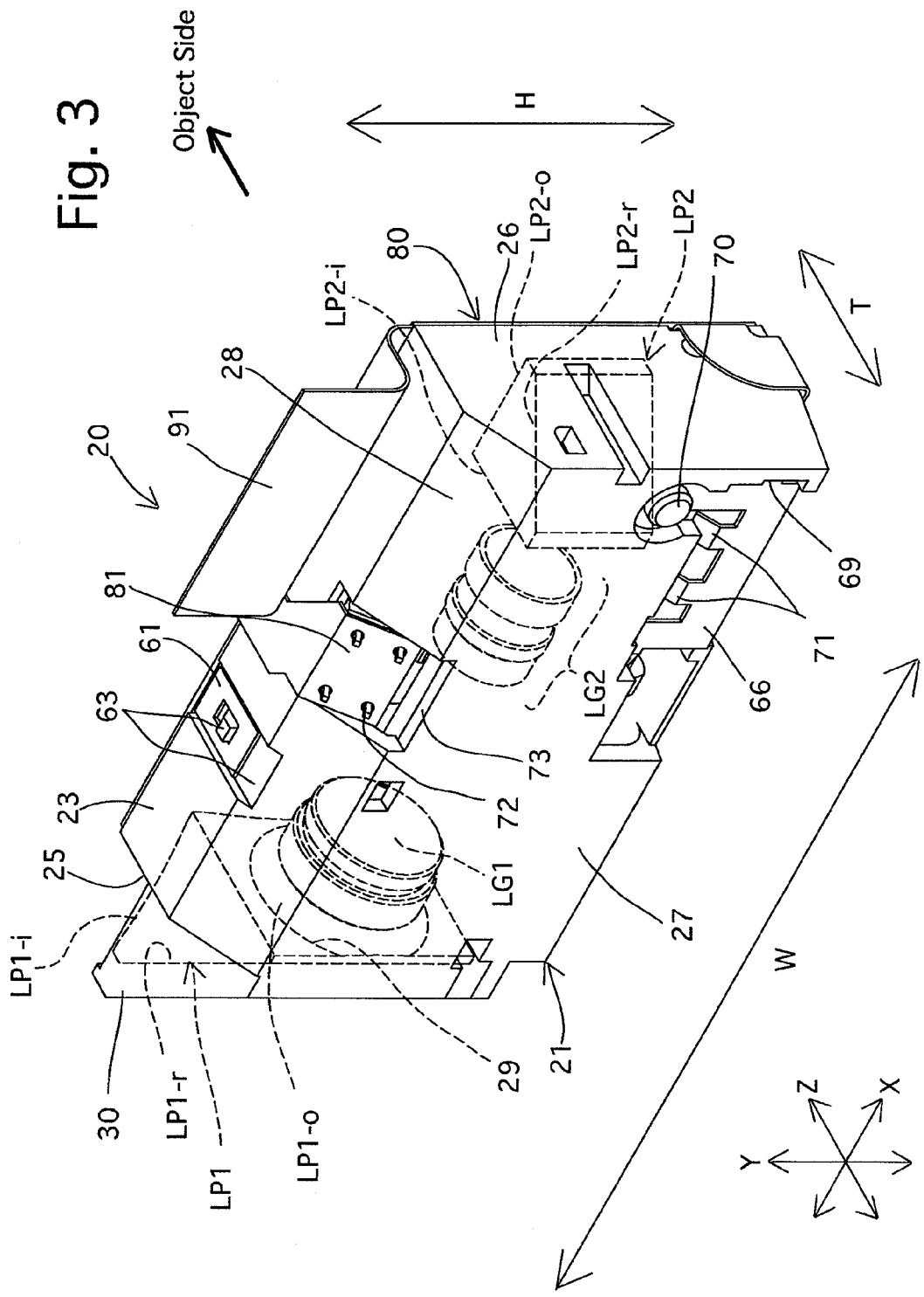
FIG. 3 is a perspective view of the imaging unit, showing the outward appearance thereof, and further showing the interior of the imaging unit to show an imaging optical system included in the imaging unit by dashed lines.
Figure 4:
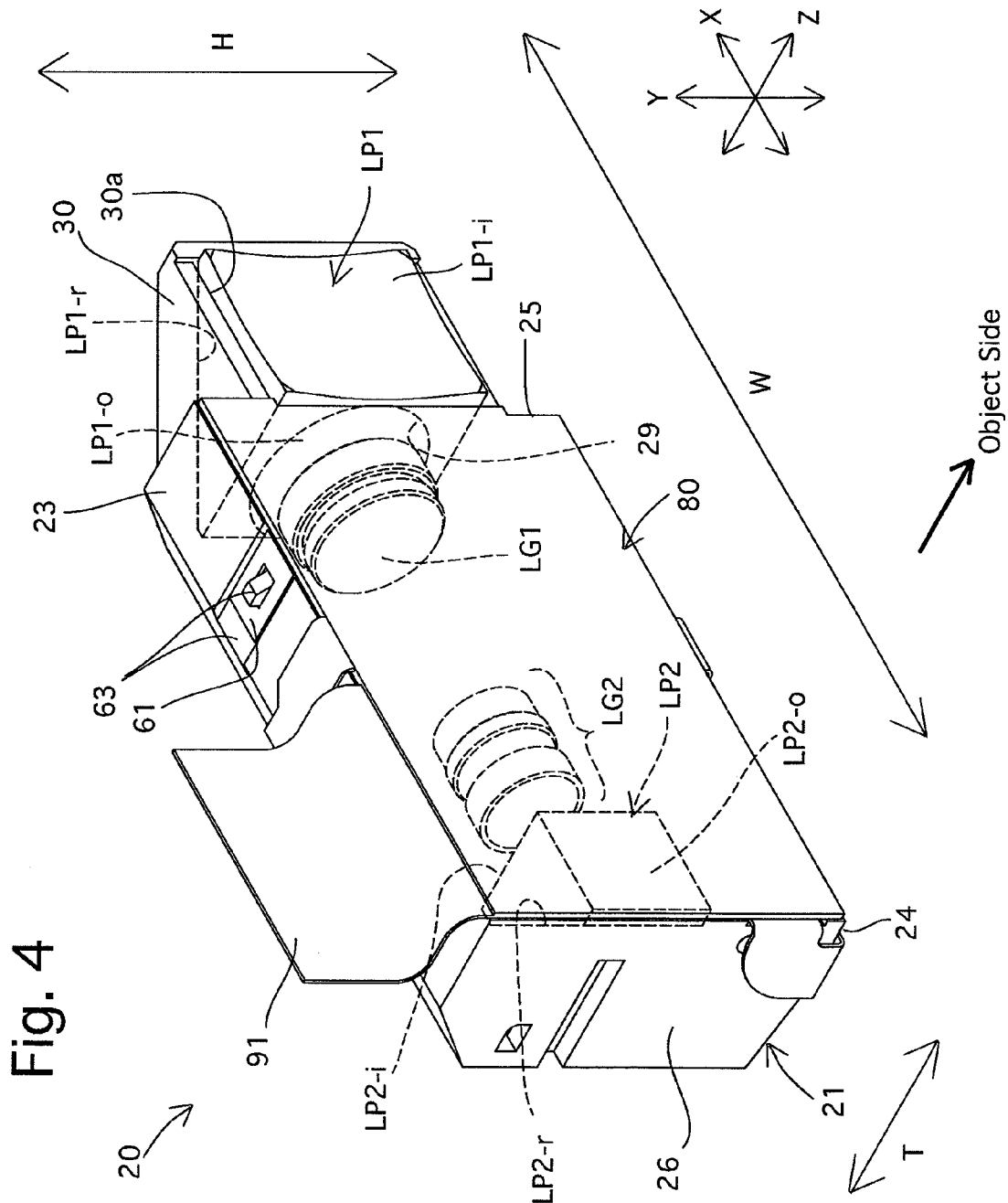
FIG. 4 is a perspective view of the imaging unit, viewed from the other side (front side) of the imaging unit (from the object side) shown in FIG. 3.

A mobile phone (cellular phone) 10 shown in FIGS. 1 and 2 is a folding type which is provided with a foldable housing including an operational portion 11 and a display portion 12, and is further provided between the operational portion 11 and the display portion 12 with a hinge portion 13. The operational portion 11 and the display portion 12 are hingedly connected with each other via the hinge portion 13 to be allowed to rotate relative to each other about an axis Q of a pair of coaxial hinge pins 13a of the hinged portion 13 so that the mobile phone 10 can change between an operating state (fully open state/unfolded state) shown in FIGS. 1 and 2, in which the operational portion 11 and the display portion 12 are fully opened, and a folded state (not shown) in which the mobile phone 10 is folded so that the operational portion 11 and the display portion 12 overlay each other. The operational portion 11 is provided with a plurality of operational keys 15 such as numerical keys and function keys, and the display portion 12 is provided with a liquid crystal display (LCD) 16 serving as a display device. The display portion 12 is provided, on the back thereof (outer surface of the display portion 12 that is exposed whether the mobile phone is a folded state or a fully open state) in the vicinity of the hinge portion 13, with a photographic aperture 14 (see FIG. 2). The mobile phone 10 is provided, behind the photographic aperture 14 with respect to FIG. 2, with an imaging unit (imaging module) 20.

The imaging unit 20 will be discussed in detail with reference to FIGS. 3 through 14. As shown in FIGS. 3 through 6 and 11, the imaging unit 20 is provided with a first prism (incident-side prism) LP1, a first lens group LG1 having negative refracting power, a second lens group LG2 having positive refracting power, and a second prism (exit-side prism) LP2, which constitute an imaging optical system, and the imaging unit 20 is constructed so that a housing 21 of the imaging unit 20 supports these four optical elements. The imaging optical system that is installed in the imaging unit 20 is a zoom optical system in which the focal length can be varied, and is constructed from the first lens group LG1 and the second lens group LG2 which are movable in the optical axis direction thereof.

The housing 21 is formed in a box-shaped body which is elongated in the horizontal direction to satisfy the following conditional expression: W>H>T, wherein W, H and T designate the width, the height and the thickness of the display portion 12 of the mobile phone 10, respectively (see FIGS. 3 and 4). In the following descriptions, the directions of the imaging unit 20 in the directions of the width W, the height H and the thickness T are referred to as X-direction, Y-direction and Z-direction, respectively. Although the upper, lower, left and right sides of the imaging unit 20 change according to the orientation of the mobile phone 10, in the following descriptions the vertical and horizontal directions of the imaging unit 20 are determined with reference to the imaging unit 20 shown in FIG. 6 for the purpose of illustration.

The front part of the housing 21, which faces toward the object side when a photograph is taken, is open to form a front opening 22. The housing 21 is provided on the upper and lower sides of the front opening 22 with an upper wall 23 and a lower wall 24, respectively, and is further provided on the right-hand side and the left-hand side of the front opening 22 with a right wall 25 and a left wall 26, respectively. The housing 21 is provided, on the opposite side thereof from the front opening 22 in the Z-direction, with a back wall 27 which closes the back of the housing 21. The upper wall 23 and the lower wall 24 are flat plates parallel to each other, each of includes X-directional components and Z-directional components. The right wall 25 and the left wall 26 are flat plates parallel to each other, each of which is composed of Y-directional components and Z-directional components. The back wall 27 is a flat panel which is composed of X-directional components and Y-directional components. The upper wall 23 and the back wall 27 are connected to each other via an oblique wall 28 (see FIGS. 3 and 5).

Figure 6:
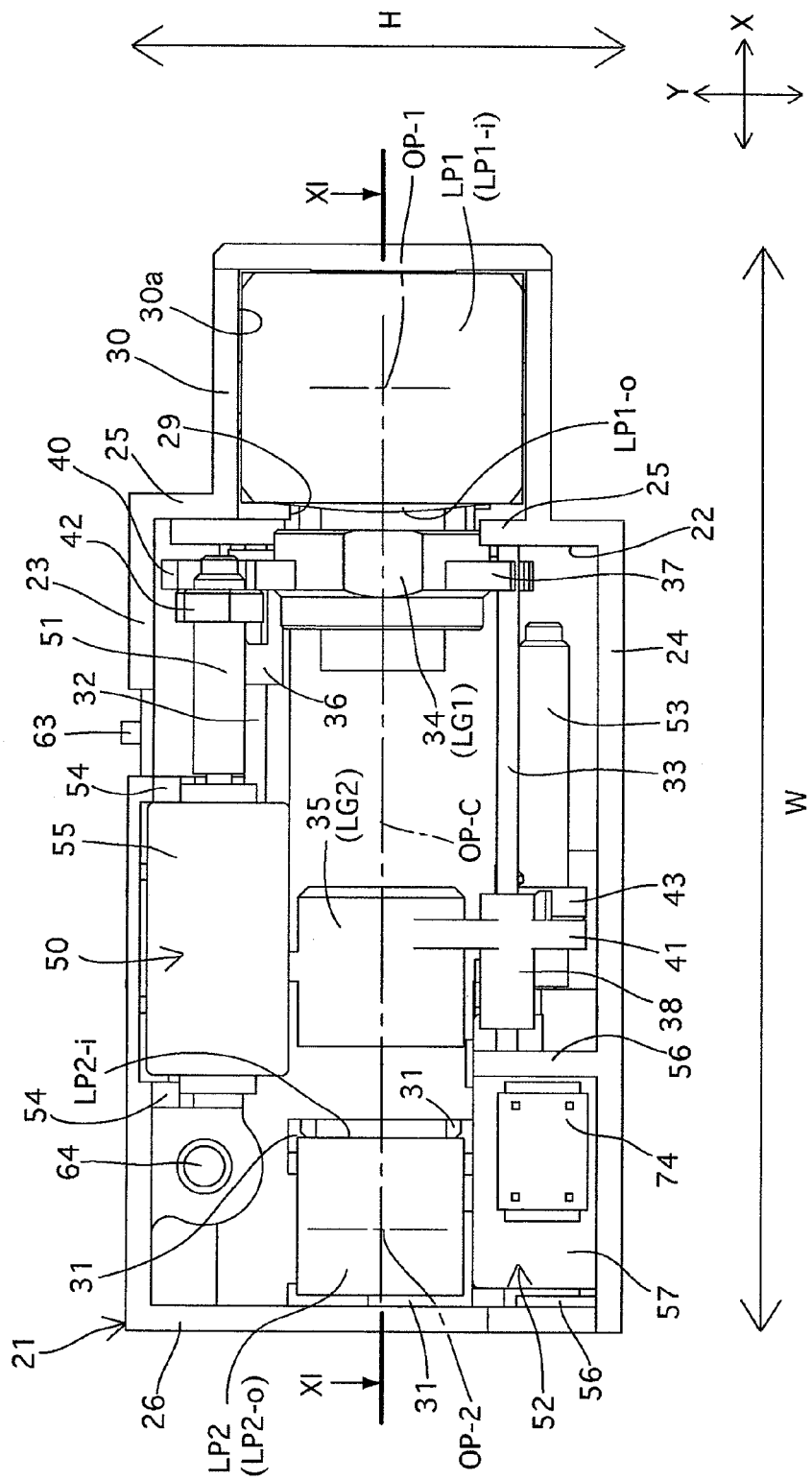
FIG. 6 is a front elevational view of the imaging unit with the cover board thereof being removed.
Figure 7:
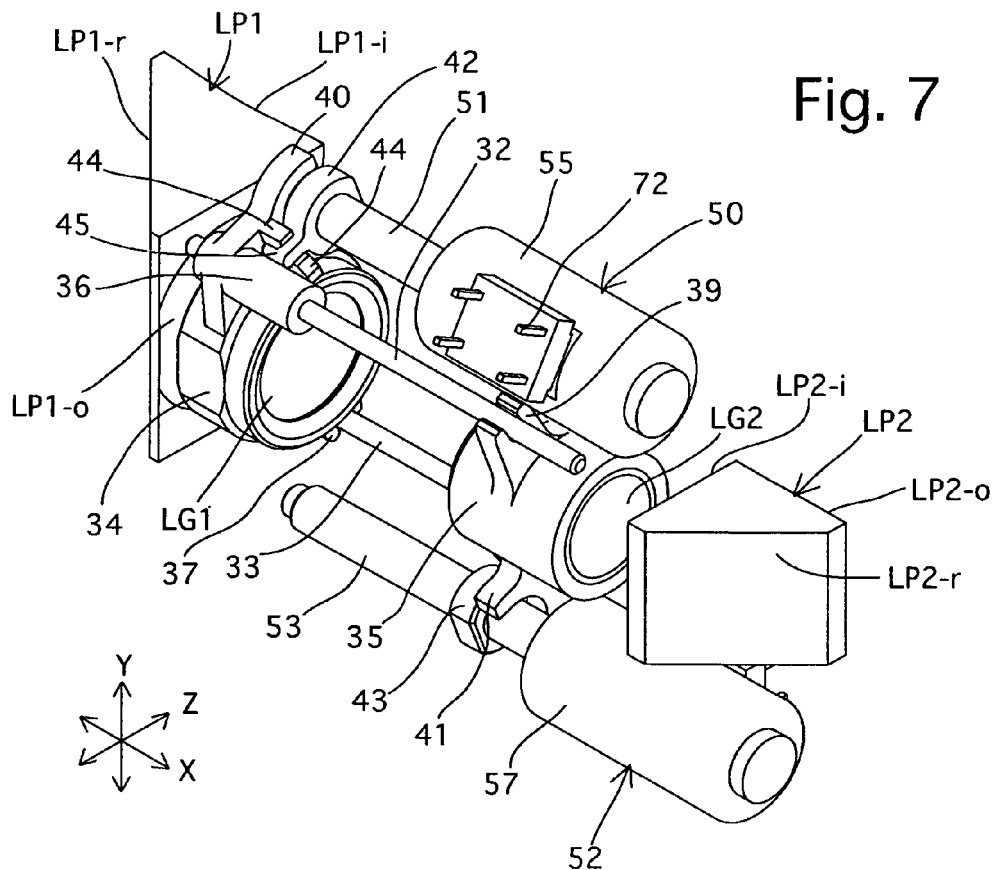
FIG. 7 is a perspective view of internal elements of the imaging unit which are housed in the housing of the imaging unit, wherein the internal elements include the imaging optical system, a support-and-guide mechanism for supporting the first lens group and the second lens group of the imaging optical system, and actuators (motors) for moving the first lens group and the second lens group.
Figure 8:
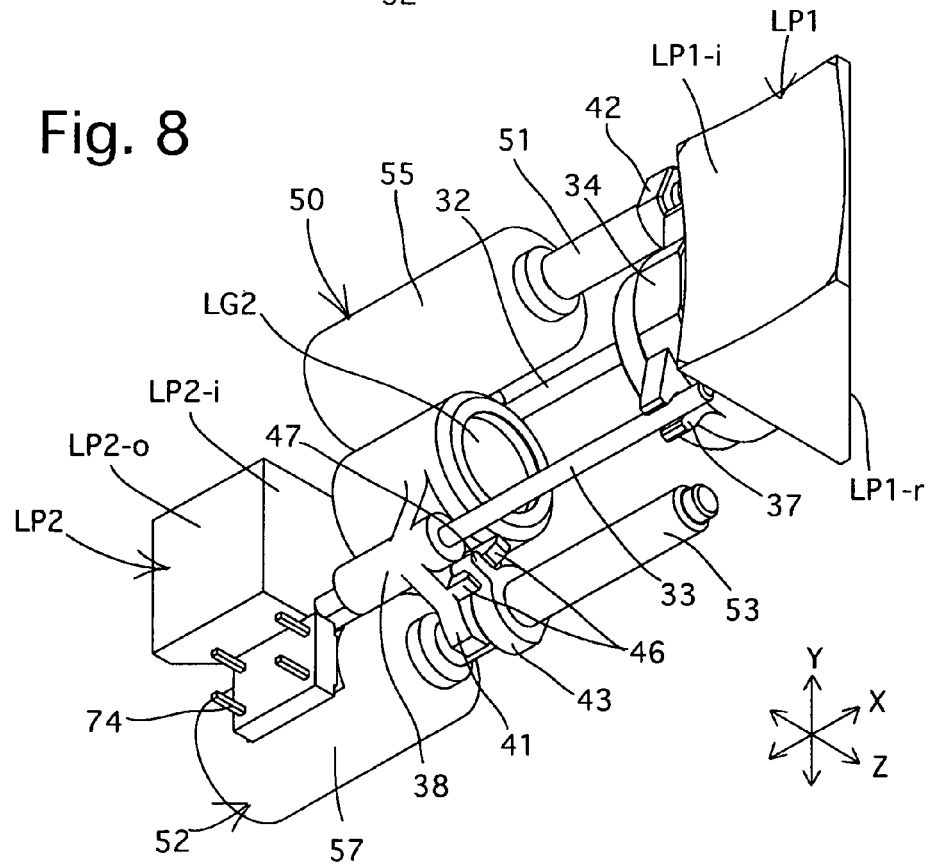
FIG. 8 is a perspective view of the internal elements shown in FIG. 7, viewed from the other side of the internal elements shown in FIG. 7.

The housing 21 is provided at one end and the other end thereof in the X-direction with a first-prism accommodation portion 30 and a second-prism accommodation portion 31 (see FIG. 6) which accommodate the first prism LP1 and the second prism LP2, respectively. As shown in FIG. 6, the second-prism accommodation portion 31 is formed as a partition wall positioned adjacent to the left wall 26 in the housing 21, whereas the first-prism accommodation portion 30 is formed as a box-shaped portion which projects sideways (rightward with respect to FIG. 6) from the right wall 25. The front of the first-prism accommodation portion 30, which faces toward the object side (toward the photographic aperture 14) when a photograph is taken, is provided with an incident opening 30a, similar to the front opening 22. Namely, the housing 21 is shaped so that almost the entire part of the front of the housing 21 that faces the back wall 27 is formed as an opening. A through hole 29 (see FIGS. 6 and 11) is formed in the right wall 25 of the housing 21 so that the internal space of the first-prism accommodation portion 30 and the internal space of the major part of the housing 21 are communicatively connected to each other in the X-direction via the through hole 29.

The first prism LP1 is a right-angle prism which is provided with an incident surface LP1-i, an exit surface LP1-o and a reflection surface LP1-r. The first prism LP1 reflects light incident from the incident surface LP1-i at a substantially right angle toward the exit surface LP1-o by the reflection surface LP1-r. The incident surface LP1-i is a concave surface and the exit surface LP1-o is a convex surface. The second prism LP2 is a right-angle prism which is provided with an incident surface LP2-i, an exit surface LP2-o, and a reflection surface LP2-r. The second prism LP2 reflects light incident on the incident surface LP2-i at a substantially right angle toward the exit surface LP2-o by the reflection surface LP2-r. In the first prism LP1 that is accommodated in the first-prism accommodation portion 30, the incident surface LP1-i is exposed to the object side through the incident opening 30a while the exit surface LP1-o is positioned to face the through hole 29, which is formed in the right wall 25 of the housing 21 to extend in the X-direction. In the second prism LP2 that is accommodated in the second-prism accommodation portion 31, the incident surface LP2-i is spaced away from the exit surface LP1-o of the first prism LP1 while the exit surface LP2-o is positioned to face the front opening 22. Namely, the first prism LP1 and the second prism LP2 are positioned so that both the incident surface LP1-i of the first prism LP1 and the exit surface LP2-o of the second prism LP2 face toward the object side.

The imaging unit 20 is provided in the housing 21 with a pair of guide bars 32 and 33 which extend parallel to each other in the X-direction. The guide bars 32 and 33 are disposed at different positions in the Y-direction. The guide bar 32 is positioned above the guide bar 33 to be closer to the upper wall 23 of the housing 21 than the guide bar 33 in the Y-direction and to be closer to the back wall 27 in the back of the housing 21 than the guide bar 33 in the Z-direction. The guide bar 33 is positioned below the guide bar 32 to be closer to the lower wall 24 than the guide bar 32 in the Y-direction and to be closer to the front opening 22 than the guide bar 32 in the Z-direction. The imaging unit 20 is provided in the housing 21 with a first lens group frame 34 and a second lens group frame 35 which support the first lens group LG1 and the second lens group LG2, respectively. The first lens group frame 34 and the second lens group frame 35 are supported by the guide bars 32 and 33 to be freely slidable thereon in the X-direction. The first lens group frame 34 is provided with a cylindrical guide portion 36 and a rotation limit arm 37 which project in substantially opposite radial directions away from each other. The cylindrical guide portion 36 is fitted on the guide bar 32 to be slidable thereon in the X-direction. The radially outer end of the rotation limit arm 37 is bifurcated to be engaged with the guide bar 33 to prevent the first lens group frame 34 from rotating about the guide bar 32. The second lens group frame 35 is provided with a cylindrical guide portion 38 and a rotation limit arm 39 which project in substantially opposite radial directions away from each other. The cylindrical guide portion 38 is fitted on the guide bar 33 to be slidable thereon in the X-direction. The radially outer end of the rotation limit arm 39 is bifurcated to be engaged with the guide bar 32 to prevent the second lens group frame 35 from rotating about the guide bar 33. Due to the engagement of the rotation limit arm 37 with the guide bar 33 and the engagement of the rotation limit arm 39 with the guide bar 32, the first lens group frame 34 and the second lens group frame 35 are supported by the guide bars 32 and 33 to be freely movable linearly in the X-direction. In a state where the first lens group frame 34 and the second lens group frame 35 are supported by the guide bars 32 and 33, the first lens group LG1 and the second lens group LG2 are positioned between the first prism LP1 and the second prism LP2 in the X-direction, while the first lens group LG1 and the second lens group LG2 face the exit surface LP1-o of the first prism LP1 and the incident surface LP2-i of the second prism LP2, respectively, as shown in FIGS. 3, 4, 6, 7, 8 and 11.

Figure 11:
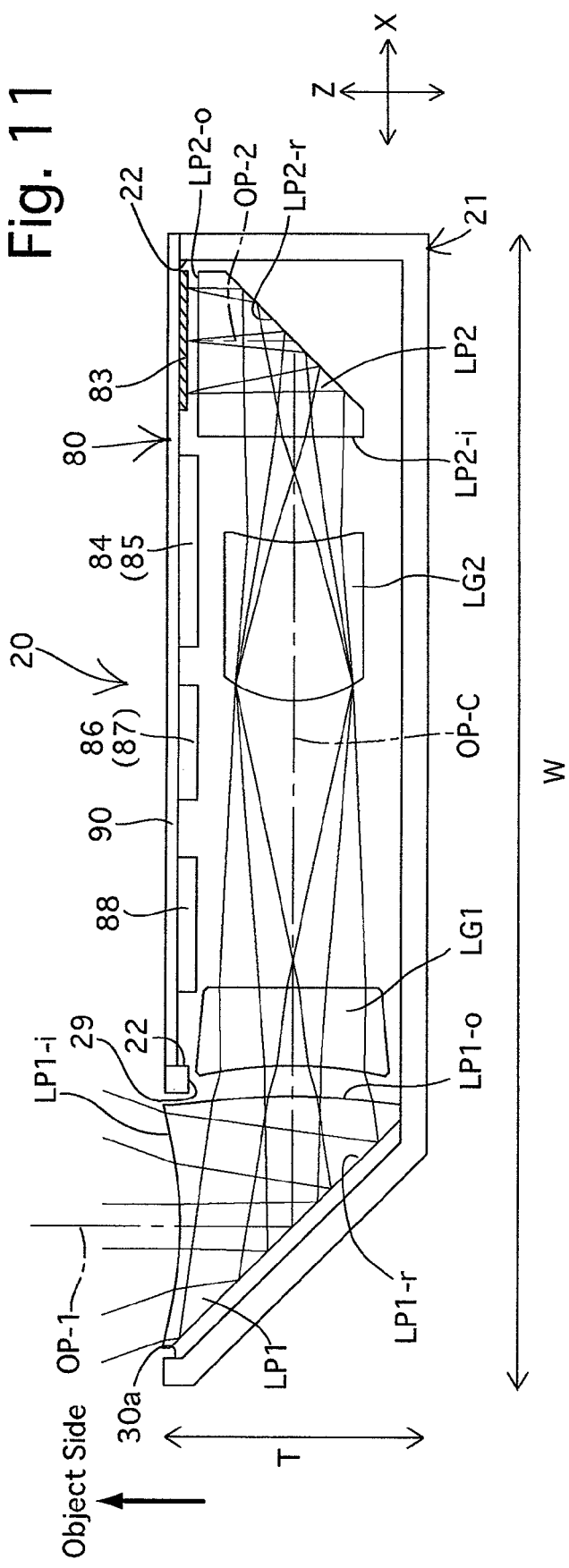
FIG. 11 is a cross sectional view taken along XI-XI line shown in FIG. 6.

In a state where an imaging optical system is supported by the housing 21 therein as described above, light from the object side is incident on the incident surface LP-i of the first prism LP1 along an incident optical axis OP-1 that extends in the Z-direction as shown in FIG. 11. The first prism LP1 reflects the incident light by the reflection surface LP1-r at a substantially right angle, and the light thus reflected by the reflection surface LP1-r travels through the first lens group LG1 and the second lens group LG2 along an intermediate optical axis (primary optical axis) OP-C that extends in the X-direction to be incident on the incident surface LP2-i of the second prism LP2. The second prism LP2 reflects the incident light toward the object side by the reflection surface LP2-r at a substantially right angle so that the light thus reflected by the reflection surface LP2-r exits from the second prism LP2 through the exit surface LP2-o along an exit optical axis OP-2 that extends in the Z-direction. Accordingly, the imaging optical system that is provided in the imaging unit 20 is configured as an optical system including the incident optical axis OP-1, the intermediate optical axis OP-C and the exit optical axis OP-2, which constitute a single optical axis bent in a substantially U-shape. The positions of the incident optical axis OP-1, the intermediate optical axis OP-C and the exit optical axis OP-2 in the Y-direction are mutually identical, so that the incident optical axis OP-1, the intermediate optical axis OP-C and the exit optical axis OP-2 all lie in a common plane. The exit optical axis of the first prism LP1 and the incident optical axis of the second prism LP2 are coincident with the intermediate optical axis OP-C.

Figure 9:
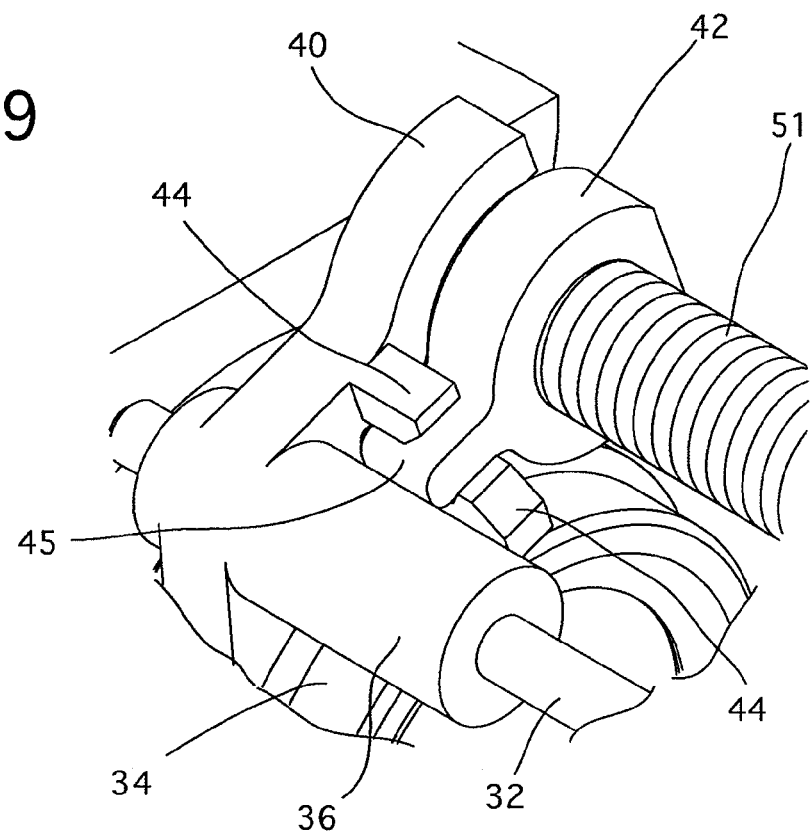
FIG. 9 is an enlarged perspective view of a part of the internal elements shown in FIG. 7 in the vicinity of an engaged portion between the nut-engaging portion of the first lens group frame and the nut on the first motor side.
Figure 10:
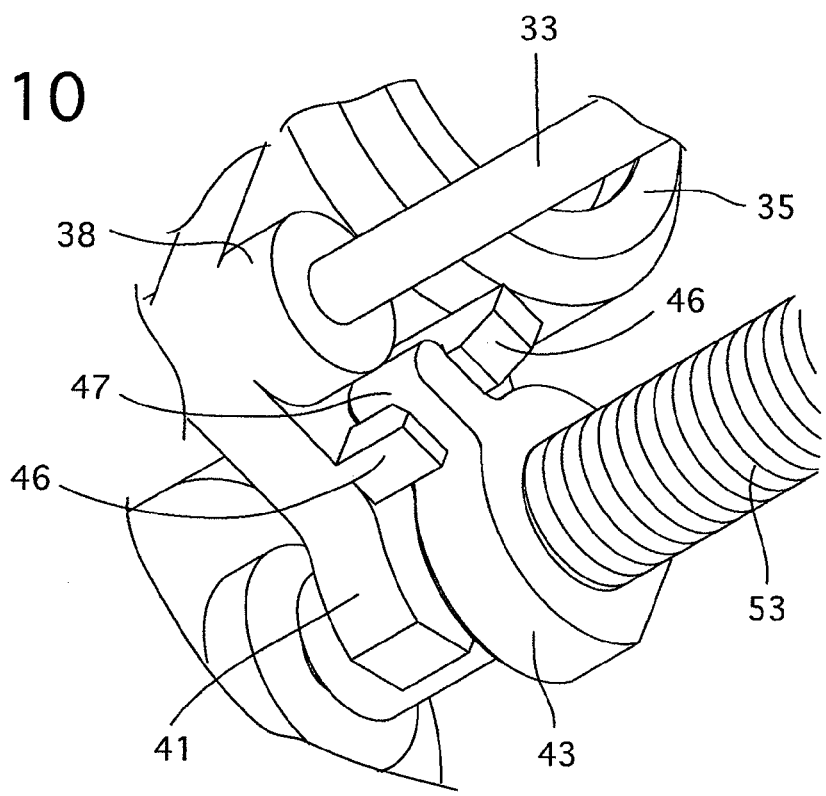
FIG. 10 is an enlarged perspective view of a part of the internal elements shown in FIG. 8 in the vicinity of an engaged portion between the nut-engaging portion of the second lens group frame and the nut on the second motor side.

The first lens group frame 34 is provided with a nut-engaging portion 40 and the second lens group frame 35 is provided with a nut-engaging portion 41. A nut 42 is engaged with the nut-engaging portion 40 and a nut 43 is engaged with the nut-engaging portion 41. As shown in FIG. 9 as an enlarged view, the nut 42 is engaged with the nut-engaging portion 40 with a held projection 45 (which projects radially from the nut 42) being held (snap-fitted) between a pair of holding projections 44 which project from the nut-engaging portion 40 so that the first lens group frame 34 and the nut 42 move together in the X-direction. Likewise, as shown in FIG. 10 as an enlarged view, the nut 43 is engaged with the nut-engaging portion 41 with a held projection 47 (which projects radially from the nut 43) being held (snap-fitted) between a pair of holding projections 46 which project from the nut-engaging portion 41 so that the second lens group frame 35 and the nut 43 move together in the X-direction.

The imaging unit 20 is provided therein with a first motor (actuator) 50 for driving the first lens group LG1 and a second motor (actuator) 52 for driving the second lens group LG2. The nut 42 is provided with a screw hole (through hole) in which a drive shaft (feed screw shaft) 51 of the first motor 50 is screw-engaged, while the nut 43 is provided with a screw hole (through hole) in which a drive shaft (feed screw shaft) 53 of the second motor 52 is screw-engaged. The first motor 50 is supported by the housing 21; more specifically, the first motor 50 is provided with a cylindrical motor body 55, and the housing 21 is provided therein with a motor support portion 54 (see FIG. 6) which is formed on a portion of the housing 21 in the vicinity of the upper wall 23 to support the motor body 55 with the axis thereof extending in the X-direction. The drive shaft 51 of the first motor 50 extends from the motor body 55 of the first motor 50 in a direction to approach the right wall 25. The second motor 52 is also supported by the housing 21; more specifically, the second motor 52 is provided with a cylindrical motor body 57, and the housing 21 is provided therein with a motor support portion 56 (see FIG. 6) which is formed on a portion of the housing 21 in the vicinity of the lower wall 24 to support the motor body 57 with the axis thereof extending in the X-direction. The drive shaft 53 of the second motor 52 extends from the motor body 57 of the second motor 52 in a direction to approach the right wall 25. Accordingly, in addition to the guide bars 32 and 33, the first motor 50 (the drive shaft 51 thereof) and the second motor 52 (the drive shaft 53 thereof) are also arranged so that the lengthwise directions (axial directions) thereof become substantially parallel to the X-direction. In addition, the first motor 50 is positioned in the vicinity of the front opening 22 (at a position closer to the object side than the second motor 52) in the Z-direction, while the second motor 52 is positioned in the back of the housing 21 in the vicinity of the back wall 27 in the Z-direction.

A rotation of the drive shaft 51 of the first motor 50 causes the nut 42 to move in the X-direction due to the screw-engagement of the nut 42 with the feed screw thread on the drive shaft 51, thus causing the first lens group frame 34 to move in the X-direction since the nut 42 is prevented from rotating in a state where the nut 42 is engaged with the nut-engaging portion 40. Likewise, a rotation of the drive shaft 53 of the second motor 52 causes the nut 43 to move in the X-direction due to the screw-engagement of the nut 43 with the feed screw thread on the drive shaft 53, thus causing the second lens group frame 35 to move in the X-direction since the nut 43 is prevented from rotating in a state where the nut 43 is engaged with the nut-engaging portion 41.

As described above, the optical system provided in the imaging unit 20 is a zoom optical system in which the focal length varies by moving the first lens group frame 34 and the second lens group frame 35 (namely, the first lens group LG1 and the second lens group LG2) relative to each other in the X-direction in a predetermined moving manner. Additionally, a focusing operation can be carried out by moving either the first lens group LG1 or the second lens group LG2 in the X-direction. Although it is optional as to which of the first lens group LG1 and the second lens group LG2 is used as a focusing lens group, the second lens group LG2 is used as a focusing lens group in the present embodiment of the imaging unit 20.

Figure 5:
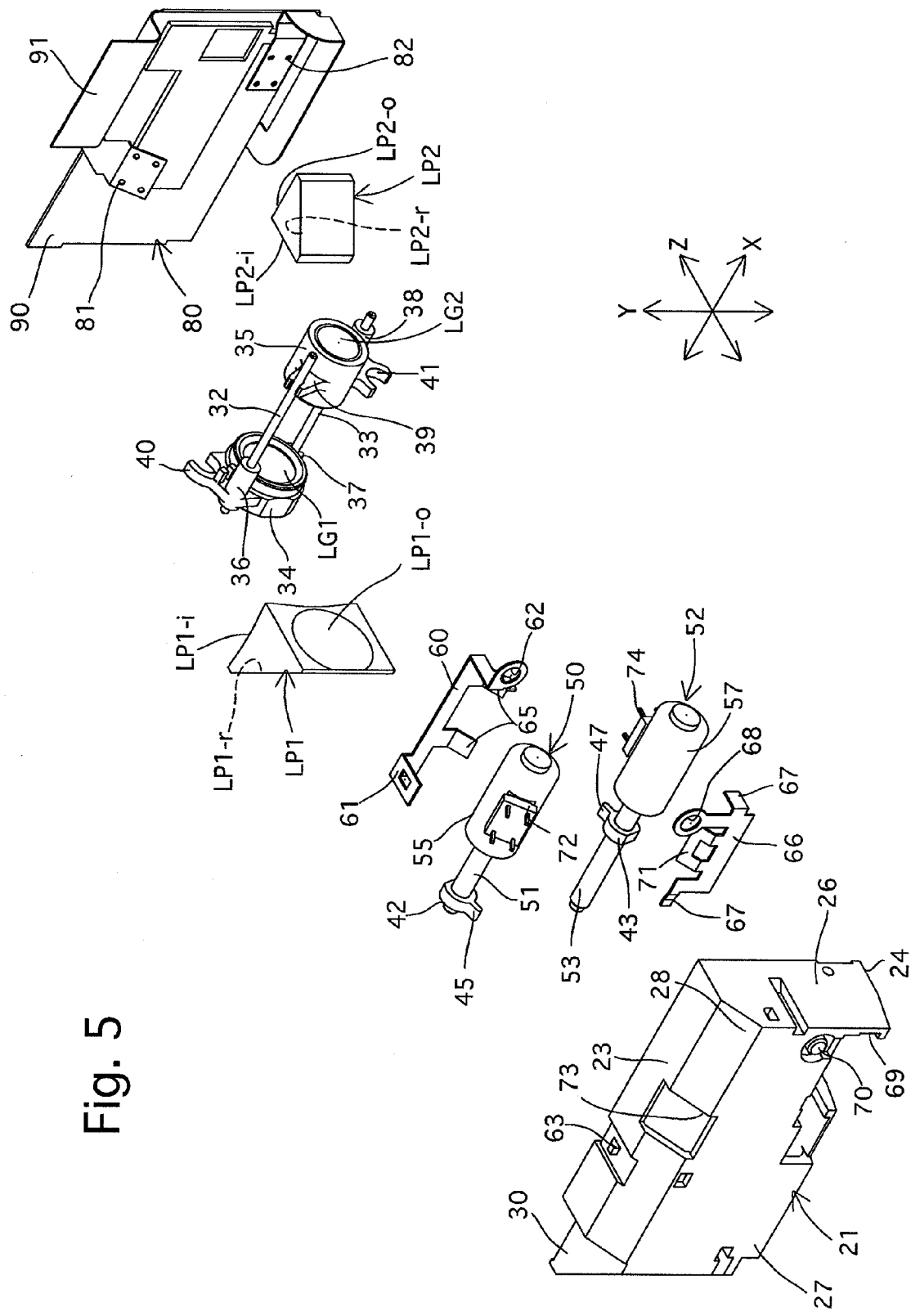
FIG. 5 is an exploded perspective view of the imaging unit.

The first motor 50 is held by a first-motor holding member 60 (see FIG. 5). The first-motor holding member 60 is a plate-like member elongated in the X-direction. The first-motor holding member 60 is provided, at one end and the other end thereof in the X-direction, with a mounting arm 61 and a positioning hole 62, respectively. The mounting arm 61 and the positioning hole 62 are brought to be engaged with a fixing portion (fixing lug) 63 and a positioning pin 64 (see FIG. 6) which project from the housing 21, respectively, to fix the first-motor holding member 60 to the housing 21. In this state where the first-motor holding member 60 is fixed to the housing 21, a holding lug 65 formed at a center of the first-motor holding member 60 is in press contact with the motor body 55 of the first motor 50 to hold the first motor 50. FIG. 6 shows a state where the first-motor holding member 60 is removed from the housing 21. The second motor 52 is held by a second-motor holding member 66 (see FIG. 5). The second-motor holding member 66 is provided, at the opposite ends thereof in the X-direction, with two mounting arms 67, respectively, and is further provided, at a position adjacent to one of the two mounting arms 67, with a positioning hole 68. The first-motor holding member 60 is fixed to the housing 21 from the front opening 22 side, while the second-motor holding member 66 is fixed to the housing 21 from the back wall 27 side. As shown in FIG. 5, a recess/cutout, in which the second-motor holding member 66 is fixedly positioned, is formed in the back wall 27. The housing 21 is provided in the above-mentioned recess thereof with two mounting portions 69 (only one of which appears in FIG. 5) with which the two mounting arms 67 of the second-motor holding member 66 are engaged, and is further provided in the recess with a positioning projection 70 with which the positioning hole 68 is engaged. In a state where the second-motor holding member 66 is fixed to the housing 21 to be positioned inside the recess on the back wall 27 side, a holding lug 71 formed at a center of the second-motor holding member 66 is in press contact with the motor body 57 of the second motor 52 so as to hold the second motor 52.

Motor terminals 72 of the first motor 50 which project from the motor body 55 are exposed to the outside of the housing 21 through a through hole 73 formed in the housing 21. Motor terminals 74 of the second motor 57 which project from the motor body 57 are extend toward the front opening 22.

Figure 12:
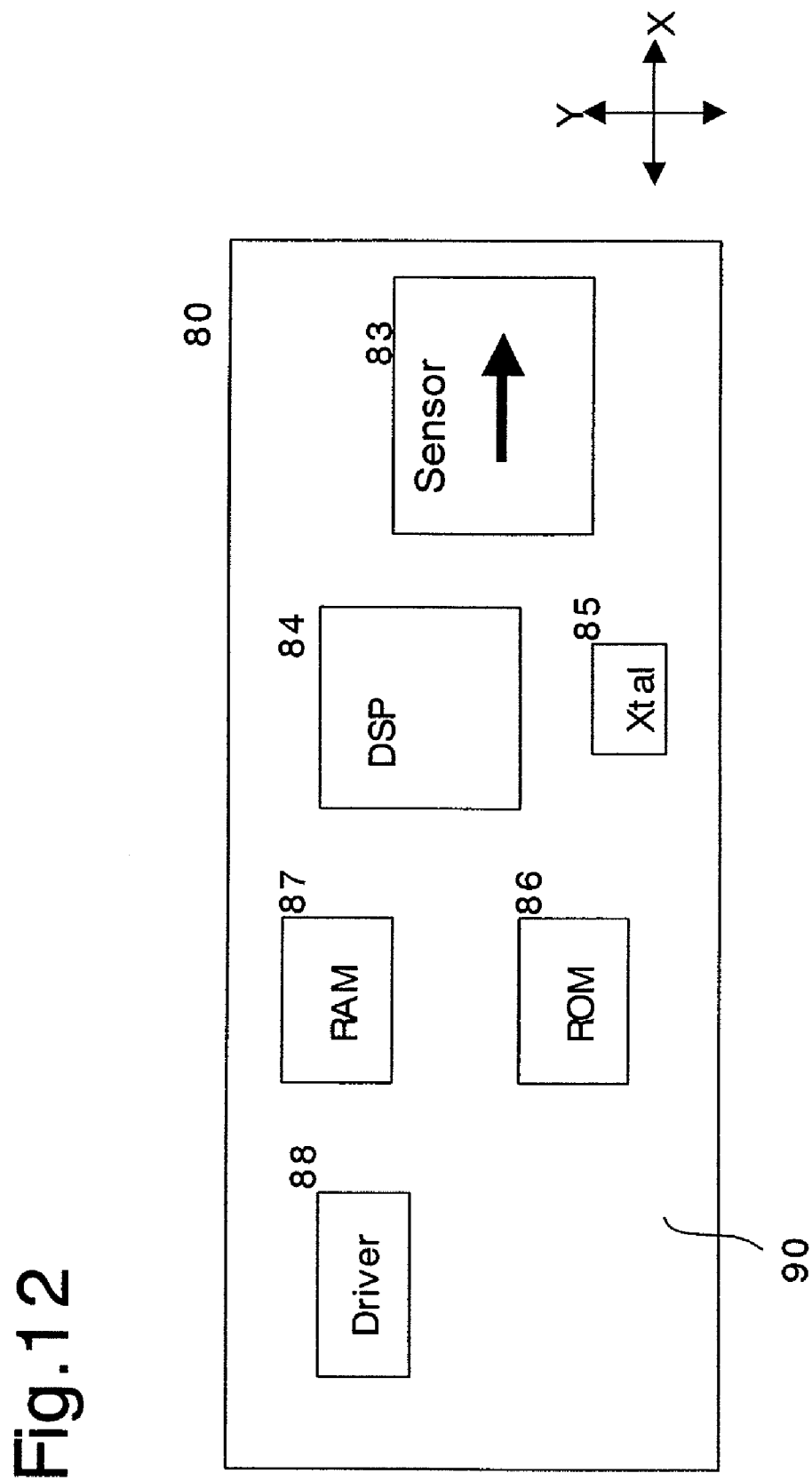
FIG. 12 is a simplified front view of the cover board of the housing, showing the layout of the electronic circuit parts contained on the cover board.

The imaging unit 20 is completed by fixing a cover board (sensor board) 80 to the housing 21 so as to close the front opening 22 after the above described elements which are to be installed to the housing 21 are installed to the housing 21. As shown in FIG. 12, the cover board 80 is provided with electronic circuit parts such as an image sensor 83, a digital signal processor (hereinafter referred to as DSP) 84, a quartz oscillator 85, a read-only memory (hereinafter referred to as ROM) 86, a random-access memory (hereinafter referred to as RAM) 87 and a motor driver 88, which are all mounted on a substrate 90 in the shape of a flat plate at different positions thereon. Each electronic part (chip) contained on the cover board 80 is fixed to the cover board 80 by connecting a bare chip to the substrate 90 by wire bonding.

Figure 13:
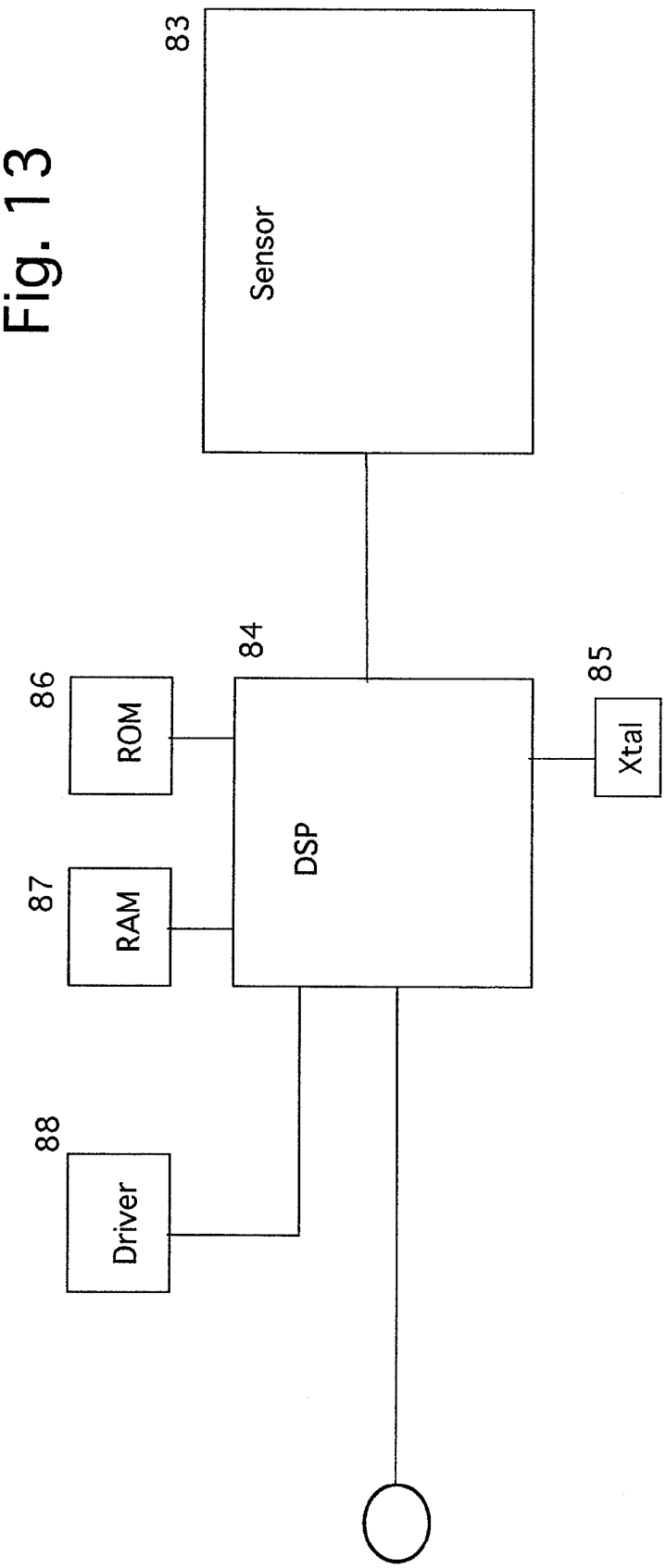
FIG. 13 is a block diagram of the electronic circuit parts contained on the cover board, showing the connection for control between the electronic circuit parts.

FIG. 13 shows the connection for control between electronic circuit parts contained on the cover board 80. The image sensor 83 is a conventional type such as a CCD or CMOS image sensor that converts light incident on the imaging surface (light-receiving surface) thereof into an electrical signal to output this signal. In live view mode in which live images (live preview) are displayed on the liquid crystal display 16, the signal from the image sensor 83 is sequentially read out therefrom by control of the DSP 84 to be processed by the DSP 84 therein in order to be generated as a signal (YUV signal) capable of being visually indicated by display elements of the liquid crystal display 16. When a photograph is taken to capture a still image, all the pixel signals (pixel data) are read out of the image sensor 83 in accordance with a control signal output from the DSP 84 to be processed by the DSP 84 therein, compressed in a predetermined format such as JPEG by the DSP 84 and output from the DSP 84 as an image signal capable of being stored into an external memory (e.g., a removable memory card). The DSP 84 also controls the operations of the first motor 50 and the second motor 52 via the motor driver 88. As described above, the first motor 50 and the second motor 52 are actuated when a zooming operation is performed to change the focal length of the zoom optical system, and the second motor 52 is actuated when a focusing operation is performed. A program for operating the DSP 84 is stored in the ROM 86. Upon startup of the power of the mobile phone 10, the DSP 84 reads in this program from the ROM 86 to perform a series of startup processes, and processes the signal output from the image sensor 83 to output object images (live preview), which visually informs the user that the mobile phone 10 has entered a ready-to-photograph state. The RAM 87 is used as a temporary storage in order for the DSP 84 to process the image signal input from the image sensor 83. The quartz oscillator 85 outputs a timing signal with a preset clock speed.

Figure 14:
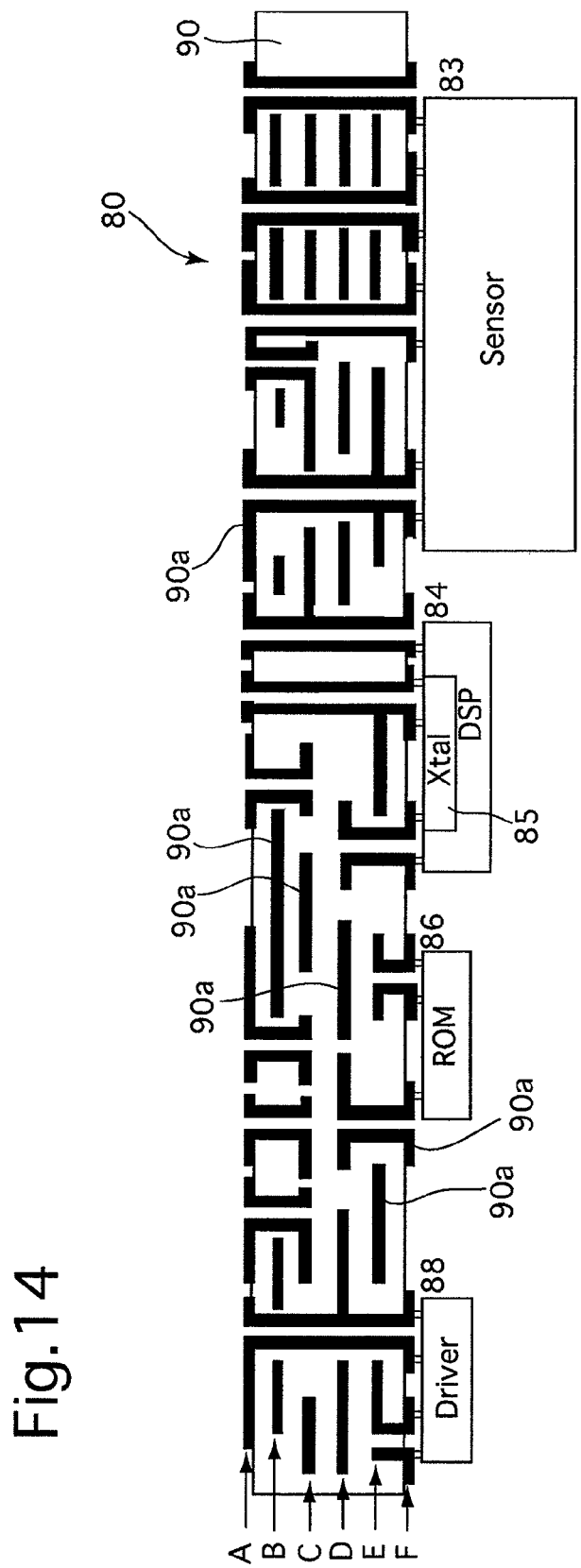
FIG. 14 is a diagram showing the structure of a cross section of the cover board.

FIG. 14 shows the structure of a cross section of the cover board 80. The cover board 80 is a rigid board in which the substrate 90 is made of a non-flexible insulating material. In addition, the cover board 80 is a multi-layer wiring board including six layers of wiring patterns 90*a* from A-layer to F-layer. It is desirable that the cover board 80 be this kind of multi-layer board at least from the viewpoint of a reduction in noise in image processing if the image processing circuit (DSP 84) and the motor driver 88 are mounted to the same circuit board.

The cover board 80 is in the shape of a rectangle elongated in the X-direction. The cover board 80 is substantially identical in two-dimensional size to the front opening 22 in the X-direction and the Y-direction. As shown in FIG. 11, upon the cover board 80 being fixed to the housing 21 so as to close the front opening 22, the imaging surface of the image sensor 83 is positioned to face the exit surface LP2-*o* of the second prism LP2. In other words, the image sensor 83 is positioned on the exit optical axis OP-2. When the cover board 80 is fixed to the housing 21, the fixing position of the cover board 80 relative to the housing 21 is finely adjusted so that an object image formed through the imaging optical system (which includes the first prism LP1, the first lens group LG1, the second lens group LG2 and the second prism LP2) supported by the housing 21 is precisely formed on the imaging surface of the image sensor 83. The cover board 80 is fixed to the housing 21 by a fixing device such as an adhesive.

When the cover board 80 is fixed to the housing 21, a motor connecting board (printed wiring board) 81 which extends from the cover board 80 is connected to the motor terminals 72 of the first motor 50, and also a motor connecting board (printed wiring board) 82 which extends from the cover board 80 is connected to the motor terminals 74 of the second motor 52. The motor connecting boards 81 and 82 are connected to the motor driver 88, so that the operations of the first motor 50 and the second motor 52 can be controlled by the motor driver 88 upon completion of the installation of the cover board 80 to the housing 21.

In the imaging unit 20 in a completed state thereof after the cover board 80 and the housing 21 have been joined to each other, the incident opening 30*a*, through which the incident surface LP-*i* of the first prism LP1 is exposed to the outside of the imaging unit 20, is the only opening in the imaging unit 20; namely, the remaining part of the imaging unit 20 is closed up. In other words, in the completed imaging unit 20, the incident opening 30*a* is the only optical opening in the housing 21 which allows light to enter the imaging unit 20 from the outside of the housing 21, so that no other optical openings allowing light to enter the imaging unit 20 from the outside of the housing 21 are provided in the housing 21. The imaging unit 20 is installed in the display portion 12 of the mobile phone 10 so that the incident surface LP1-*i* of the first prism LP1 is positioned behind the photographic aperture 14 as shown in FIGS. 1 and 2. In this installation operation, an image-signal flexible PCB (printed-circuit board) 91 which extends from the cover board 80 is connected to a control circuit (not shown) provided in the mobile phone 10.

The control circuit of the mobile phone 10 sends a control signal which is input via an operating device such as the operational keys 15 to the imaging unit 20 via the image-signal flexible PCB 91. That control signal is, e.g., a photographing-operation execution signal, a live-view (image-indication) execution signal, or a zooming operation signal. Upon inputting the photographing-operation execution signal, the imaging unit 20 carries out a photographing operation including the above-described focusing operation (in which the second lens group LG2 is driven by the second motor 52), and the imaging unit 20 sends an image signal which has been processed and formatted by the DSP 84 to be stored in memory to the control circuit via the image-signal flexible PCB 91. Upon inputting the live-view execution signal, the imaging unit 20 sends an image signal (YUV signal) for on-screen indication which has been processed by the DSP 84 to the control circuit via the flexible PCB 91. In addition, immediately after the imaging unit 20 inputs the zooming operation signal, the first motor 50 and the second motor 52 are actuated via the motor driver 88 to change the focal length of the imaging optical system of the imaging unit 20. Additionally, power is also supplied to the imaging unit 20 via the flexible PCB 91.

As described above, an imaging system of the mobile phone 10 is completed by connecting the flexible PCB 91 that extends from the imaging unit 20 to the control circuit of the mobile phone 10. In the manufacturing process of the mobile phone 10, the imaging unit 20, which includes electronic circuit parts on the cover board 80 and is assembled as a module in advance, is simply installed in the display portion 12, and accordingly, no complicated operation for installation of the imaging unit 20 is necessary; hence, the mobile phone 10 is superior in workability of assembly thereof. From a similar point of view, the mobile phone 10 is superior in maintainability when the imaging unit 20 is repaired or replaced. In addition, the load of image processing is not applied to the control circuit of the mobile phone 10 since the image signal having been processed by the DSP 84 is output from the imaging unit 20. Additionally, the mobile phone 10 does not have to be provided therein with any complicated drive mechanism for the imaging system of the mobile phone 10 because a support-and-drive mechanism (which includes a support-and-guide mechanism composed of the guide bars 32 and 33, and actuators such as the first motor 50 and the second motor 52) for moving the first lens group LG1 and the second lens group LG2 is also installed in the imaging unit 20. In other words, since all the elements for a photographing operation are designed in a module in the imaging unit 20, the versatility of the imaging unit 20 is high, so that the imaging unit 20 can be incorporated in various mobile electronic devices.

Additionally, the imaging unit 20 has been made compact in size by providing the elements of the imaging unit 20 as a unit in a space-saving manner, which contributes to miniaturization of the electronic devices installed in the mobile phone 10. The imaging optical system of the imaging unit 20 is designed as a bending optical system in which light incident from the object side through the photographic aperture 14 is bent by the first prism LP1 to travel along the X-direction and subsequently bent by the second prism LP2 to travel back toward the object side to be formed as an image on the imaging surface of the imaging sensor 83. In addition, the first lens group LG1 and the second lens group LG2 are arranged in an optical path between the first prism LP1 and the second prism LP2 in the X-direction, and also the directions of movements of the first lens group LG1 and the second lens group LG2 in a power-varying (zooming) operation or a focusing operation correspond with the X-direction. Accordingly, the size of the internal space of the imaging unit 20 in the Z-direction which is occupied by the imaging optical system of the imaging unit 20 can be within the size (thickness) of the first prism LP1 or the second prism LP2 in the Z-direction, which contributes to a reduction in thickness of the imaging unit 20 in the Z-direction even though the imaging unit 20 includes a zoom optical system.

Additionally, in the imaging unit 20, the cover board 80, which contains electronic circuit parts including the image sensor 83, serves as a cover member for the housing 21 that supports an optical system. Since the imaging surface of the image sensor 83 automatically faces the exit surface LP2-*o* of the second prism LP2 upon the cover board 80 being fixed onto the housing 21 in place, the image sensor 83 can be installed at an image-forming plane of the optical system of the imaging unit 20 with no need for any complicated support structure. Additionally, in order to close the front opening 22 that is elongated in the X-direction, the cover board 80 can also be formed in an elongated shape in the X-direction, which makes it possible to arrange a plurality of electronic circuit parts (including the image sensor 83 and the DSP 84) dispersively at different positions in the X-direction (partly in the Y-direction). As a result, the space in the Z-direction which is occupied by these electronic circuit parts (or the thickness of these electronic circuit parts in the Z-direction) can be minimized, and accordingly, the imaging unit 20 that contains not only an optical system but also an electrical circuit is successfully slimmed down on the whole in the Z-direction.

Specifically, in the present embodiment of the imaging optical system, as shown in FIG. 11, the first prism LP1 is greater in size in the Z-direction than any other optical element (the second prism LP2, the first lens group LG1 and the second lens group LG2) of the imaging unit 20; namely, the first prism LP1 is provided with a projected portion on which the incident surface LP1-*i* is formed, the projected portion projecting toward the object side by a slightly greater amount than the other optical elements of the imaging unit 20 in the Z-direction. The cover board 80 lies in an extension of this slightly projected portion of the first prism LP1 in the X-direction. In other words, the cover board 80 lies in a plane in which this slightly projected position of the first prism LP1 substantially lies. In a manner of speaking, the cover board 80 is positioned with the use of the space (dead space) in the Z-direction which is created between the first prism LP1 and the other optical elements. This has achieved a further improvement in space-saving efficiency. In particular, in the case where the imaging optical system is designed to have a wide angle of view, this particular positioning of the cover board 80 is effective since the first prism LP1 tends to be large in size.

In electronic devices having a display device which faces the user, such as the mobile phone 10, space for installation of various parts can be easily obtained because the display device itself occupies a certain area in the two-dimensional directions (X-Y directions). For instance, since the X-direction of the imaging unit 20 corresponds to the width of the liquid crystal display 16, a relatively long optical path length can be easily secured in the X-direction in the display portion 12. On the other hand, in the direction of the thickness of the liquid crystal display 16 (i.e., in the Z-direction), the sizes (thicknesses) of internal elements of the display portion 12 other than the liquid crystal display 16 tend to influence (i.e., increase) the thickness of the display portion 12. Conversely, if an internal component of the display portion 12 such as the imaging unit 20 can be slimmed in the Z-direction, the whole thickness of the mobile phone 10 can be minimized. The above described structure of the imaging unit 20 achieves a reduction in size of the imaging unit 20 in the Z-direction, thus making it possible to contribute to a reduction in thickness of the mobile phone 10.

The imaging unit 20 is disposed in the display portion 12 so that the direction of the length of the imaging unit 20 (i.e., the X-direction) is coincident with the widthwise direction of the display portion 12 (i.e., the direction substantially parallel to the axis Q of the pair of hinge pins 13*a*) and so that the direction of the short-length (height) of the imaging unit 20 (i.e., the Y-direction) is coincident with the direction of the longitudinal direction of the display portion 12 (i.e., a direction substantially orthogonal to the axis Q of the pair of hinge pins 13*a*). In other words, as shown in FIGS. 1 and 2, the imaging unit 20 is positioned in the display portion 12 so that an intermediate optical axis OP-C of the imaging optical system installed in the imaging unit 20 becomes substantially parallel to the axis Q of the pair of hinge pins 13*a*. Since the imaging unit 20 is installed between the hinge portion 13 and the liquid crystal display 16 in the longitudinal direction of the display portion 12, the space for installation of the imaging unit 20 which extends in the said longitudinal direction of the display portion 12 is limited by the dimensions of the liquid crystal display 16. On the other hand, the liquid crystal display 16 does not limit the space for installation of the imaging unit 20 in the widthwise direction of the display portion 12. Therefore, the above described orientation of the imaging unit 20 with respect to the display portion 12 makes it possible to install the imaging unit 20 in the display portion 12 in a space-saving manner without the imaging unit 20 interfering with the liquid crystal display 16. In other words, the liquid crystal display 16 having a wide display area can be adopted.

In the imaging unit 20, circuit parts associated with imaging (image capturing) are integrated on the cover board 80 so that no complicated wiring is necessary, which makes it possible to simplify the structure of the electrical equipment of the imaging unit 20. Furthermore, the cover board 80 is also designed so that electrical noise are not be easily carried on image signals of picture images output via the image sensor 83 and the DSP 84. As mentioned above, in the imaging optical system of the imaging unit 20, the optical path length thereof in the X-direction along the intermediate optical axis OP-C is long to secure the range of movement of the first lens group LG1 and the second lens group LG2. The cover board 80 has a flat board surface substantially parallel to the intermediate optical axis OP-C, which is a primary optical axis of the imaging unit 20, and is rectangular in shape, elongated in the X-direction along the intermediate optical axis OP-C. As shown in FIGS. 11 and 12, among the elements on the cover board 80, the image sensor 83 is disposed in a close vicinity of one of the opposite ends of the cover board 80 in the X-direction on a portion of the substrate 90 which faces the exit surface LP2-o of the second prism LP2, while the DSP 84 is disposed at a position on the substrate 90 adjacent to the image sensor 83 in the X-direction (a position relatively closer to the first prism LP1 than the image sensor 83). The quartz oscillator 85 is disposed at substantially the same position as the DSP 84 in the X-direction and also at a position different from the position of the DSP 84 in the Y-direction. In contrast to the image sensor 83 and the DSP 84 which are electronic parts for generating images, the motor driver 88 is disposed in close vicinity of the other end of the cover board 80 in the X-direction, i.e., in close vicinity of a side of the cover board 80 which is closest to the first prism LP1. The DSP 84 is disposed at a position closer to the image sensor 83 than the motor driver 88 in the X-direction.

According to this configuration, the motor driver 88, which serves as a drive circuit for the first lens group LG1 and the second lens group LG2, and the image sensor 83 can be disposed on the same cover board 80 while the motor driver 88, which may become a source of noise to signals of picture images, can be disposed at a position sufficiently far away from the image sensor 83 and the DSP 84. Accordingly, high-quality picture images with less noise can be obtained even though the imaging unit 20 that includes the cover board 80 is designed to be simple in structure and compact in size (slimmed down in the Z-direction in particular). Additionally, in the cover board 80, the X-direction area between the DSP 84 and the motor driver 88 is effectively used for installation of the ROM 86 and the RAM 87. Hence, the cover board 80 also has superior space-saving efficiency in general.

Figure 18:
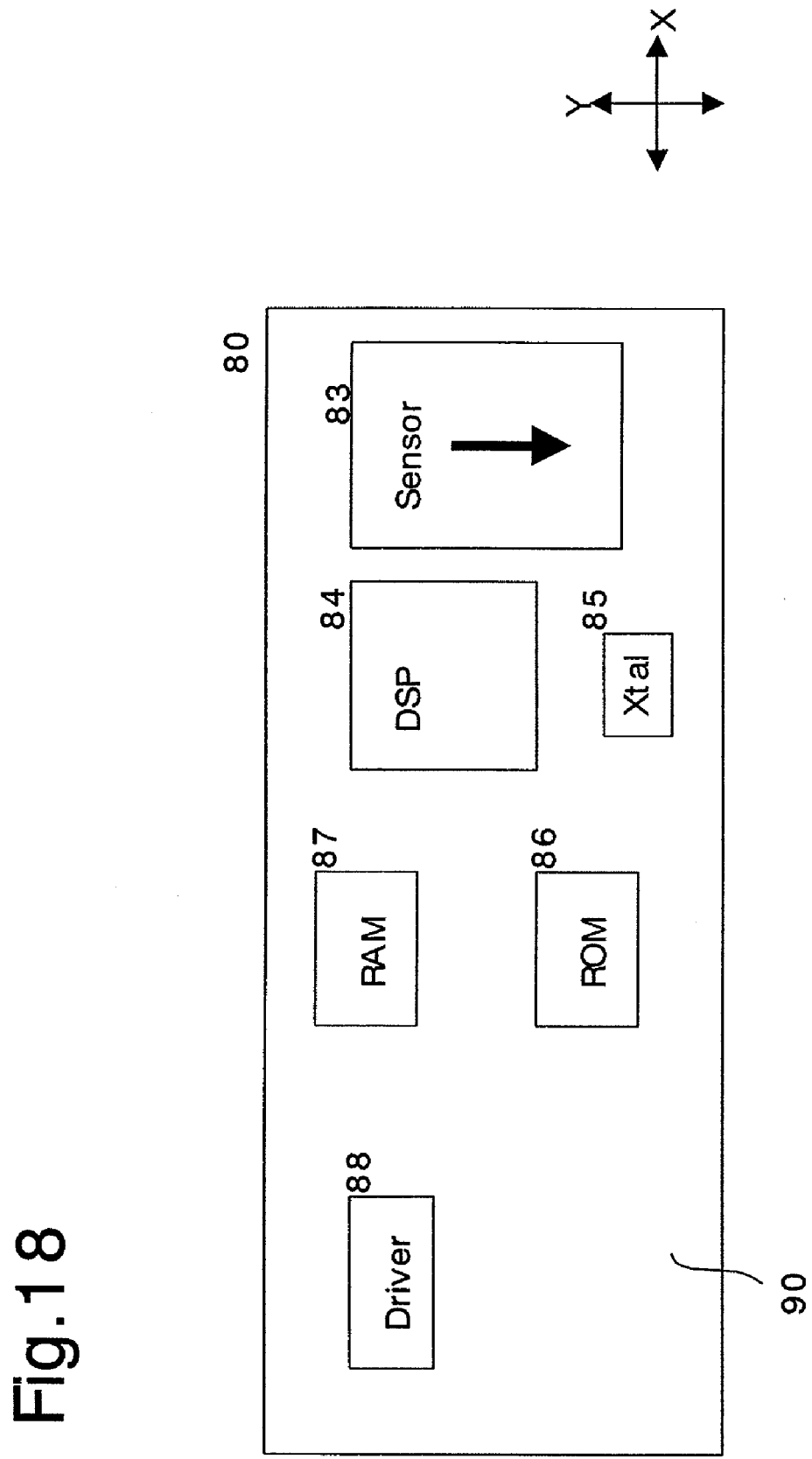
FIG. 18 is a view similar to that of FIG. 12, showing another embodiment of the placement of the image sensor on the cover board, in which the positions of the long sides and the short sides of the image sensor are reversed.

In the embodiment shown in FIG. 12, the image sensor 83 that has a substantially rectangular shape is disposed on the cover board 80 so that the long sides and the short sides of the image sensor 83 extend in the X-direction and the Y-direction, respectively, and the remaining circuit parts on the cover board 80 such as the DSP 84, the motor driver 88 and other parts are positioned in an area of the cover board 80 adjacent to one of the short sides of the image sensor 83 (the left-hand side of the image sensor 83 with respect to FIG. 12). In contrast to this arrangement, as shown in FIG. 18, the image sensor 83 can also be disposed on the cover board 80 with the lengthwise direction of the rectangular-shaped image sensor 83 extending in the Y-direction so that the long sides and the short sides of the image sensor 83 extend in the Y-direction and the X-direction, respectively, i.e., so that the lengthwise direction of the image sensor 83 becomes substantially orthogonal to the lengthwise direction of the cover board 80. In this case, the remaining circuit parts on the cover board 80 such as the DSP 84 and other parts are positioned in an area of the cover board 80 adjacent to one of the long sides of the image sensor 83 (the left-hand side of the image sensor 83 with respect to FIG. 18), similar to the arrangement shown in FIG. 12. In the embodiment shown in FIG. 18, the DSP 84 is also disposed on the cover board 80 at a position thereon closer to the image sensor 83 than the motor driver 88 in the X-direction, similar to the disposition shown in FIG. 12. In either of the embodiments shown in FIGS. 12 and 18, both miniaturization and noise reduction of picture images of the imaging unit 20 such as described above is ensured due to the positions all the circuit parts other than the image sensor 83 being concentrated only in an area on the cover board 80 adjacent to one of the four sides of the rectangular-shaped image sensor 83. In the embodiment shown in FIG. 18 in particular, since the image sensor 83 is disposed so that the direction of the long sides of the cover board 80 extend in the direction of the short sides of the cover board 80 (in the Y-direction), a large mounting space on the cover board 80 in the direction of the long sides of the cover board 80 (the direction of the primary optical axis of the cover board 80, i.e., the X-direction) can be secured, which makes it possible to increase the distance between the image sensor 83 and the motor driver 88, thus being advantageous for reduction of noise which interferes with signals of picture images.

As described above, the present embodiment of the imaging unit 20 is superior in ease of handling during manufacturing and maintenance. In addition, the present embodiment of the imaging unit 20 is configured so that electrical noise is not easily carried on picture images obtained via the image sensor 83 and the DSP 84 even though the imaging unit 20 is compact in size. Accordingly, the present embodiment of the imaging unit 20 is suitable for being installed in a portable electronic device such as the mobile phone 10.

In the above described embodiment, as shown in FIG. 11, the electronic circuit parts (which include, e.g., the DSP 84) on the cover board 80 except the image sensor 83 are mounted to the surface of the cover board 80 on which the image sensor 83 is mounted, i.e., to the inner surface of the cover board 80 that faces inside the housing 21 when the cover board 80 is fixed to the housing 21. This structure enhances the utilization of the internal space of the housing 21, thus making it possible to achieve further miniaturization of the imaging unit 20. Moreover, this structure is effective in terms of protection of the electronic circuit parts on the cover board 80 from damage and protection from dust.

However, in an imaging unit 120 as shown in FIG. 15, it is possible for the electronic circuit parts contained on a cover board 180 other than an image sensor 183, i.e., a DSP 184, a quartz oscillator 185, a ROM 186, a RAM 187 and a motor driver 188 (which correspond to those shown in FIG. 11, respectively), to be disposed on the outer surface (surface facing toward the object side) of a substrate 190 (which corresponds to the substrate 90 shown in FIG. 11), which is on the opposite surface of the substrate 190 from the imaging sensor 183 side. The imaging unit 120 except the cover board 180 is identical in structure to the first embodiment of the imaging unit 20 shown in FIG. 11, and elements of the imaging unit 120 which are identical to those of the imaging unit 20 are designated by the same reference numerals. In the imaging unit 120, the cover board 180 serves as a cover member for closing (covering) the front opening 22 of the housing 21. Electronic circuit parts such as the DSP 184 which are supported by the outer surface of the cover board 180 thereon do not project further toward the object side from the incident surface LP1-i, thus not hindering miniaturization of the imaging unit 120 in the Z-direction.

Additionally, according to the present invention, the imaging unit installed in the display portion 12 can be constructed like an imaging unit 220 shown in FIG. 16 or an imaging unit 320 shown in FIG. 17. Unlike the imaging unit 20 shown in FIG. 11 and the imaging unit 120 shown in FIG. 15, the imaging unit 220 shown in FIG. 16 is constructed so that the light which is incident on an incident surface LP2-*i*' of a second prism LP2' along the intermediate optical axis OP-C is reflected rearward, toward the back of the imaging unit 320 (i.e., reflected toward the side opposite to the object side), to exit from the imaging unit 220 along an exit optical axis OP-2' which is identical in direction to the incident optical axis OP-1. In a housing 221 of the imaging unit 220 which supports optical elements including the second prism LP2', a portion of the housing 221 which corresponds to the front opening 22 of the housing 21 shown in FIGS. 11 and 15 is closed, while a rear opening 227 is formed in a portion of the back wall of the housing 221 which faces the exit surface LP2-*o*' of the second prism LP2'. The rear opening 227 is formed to extend from the exit portion located on an extension of the exit optical axis OP-2' (from which the light reflected by a reflection surface LP2-*r*' of the second prism LP2' exits the housing 221) to an area along side (parallel to) the intermediate optical axis OP-C in the X-direction, and the rear opening 227 is covered by a cover board 280 which contains the image sensor 283 thereon. The cover board 280 is provided with electronic circuit parts such as an image sensor 283, a DSP 284, a quartz oscillator 285, a ROM 286, a RAM 287 and a motor driver 288 which are all mounted on the same side of a substrate 290 at different positions thereon. In a state where the cover board 280 is fixed to the housing 221, the image sensor 283 is positioned so that the image sensor 283 faces the exit surface LP2-*o*' of the second prism LP2' and so that the DSP 284, the quartz oscillator 285, the ROM 286, the RAM 287 and the motor driver 288 that are mounted on the same side of the substrate 290, are accommodated in the space in the housing 221 which extends along side (parallel to) the intermediate optical axis OP-C.

FIG. 17 shows another embodiment of the imaging unit installed in the display portion 12 of the mobile phone 10. The imaging optical system included in the imaging unit 320 shown in FIG. 17 is identical in optical configuration to the imaging optical system included in the imaging unit 220 shown in FIG. 16, and the imaging unit 320 is different from the imaging unit 220 solely in that an image sensor 383 and other electronic circuit parts (a DSP 384, a quartz oscillator 385, a ROM 386, a RAM 387 and a motor driver 388) contained on a cover board 380 are mounted on both sides of the substrate 390 of the imaging unit 320, not on the same side of the substrate 390, rather than being mounted on the same side of the substrate 290 in the imaging unit 220 shown in FIG. 16. Namely, when the cover board 380 is fixed to the housing 221, the image sensor 383 is positioned to face the exit surface LP2-*o*' of the second prism LP2', similar to the image sensor 283 shown in FIG. 16. However, the DSP 384, the quartz oscillator 385, the ROM 386, the RAM 387 and the motor driver 388 are positioned on the back of the imaging unit 320 to be exposed outside thereof.

Even in the configurations of the imaging units 220 and 320 described above, the imaging units 220 and 320 are common to the imaging unit 20 shown in FIG. 11 and the imaging unit 120 shown in FIG. 15 in that the cover board (80, 18, 280 or 380) that contains the image sensor (83, 183, 283 or 383) serves as a cover member for the housing (21 or 221), and accordingly, the imaging units 220 and 320 can also obtain the same effects as the above described effects obtained in the imaging unit 20 shown in FIG. 11. Since the motor driver (188, 228 or 388) is positioned sufficiently apart from the image sensor (183, 283 or 383) in the X-direction in each of the above described embodiments of the imaging units, electrical noise caused by the motor driver exert little effect on picture images.

Similar to the first embodiment of the cover board 80, each of the cover boards 180, 280 and 380 respectively shown in FIGS. 15, 16 and 17 is a rigid board in which the substrate (190, 290 or 390) is made of a non-flexible insulating material; moreover, each of the cover boards 180, 280 and 380 is also a multi-layer wiring board including layers of wiring patterns.

Although the present invention has been discussed with reference to the above described embodiments and the accompanied drawings, the present invention is not limited solely to these particular embodiments; making various modifications to the imaging unit is possible without departing from the spirit or essential character thereof.

For instance, the imaging unit according to the present invention can be incorporated in not only mobile phones but also any other types of mobile devices such as digital cameras (still-video cameras), digital camcorders (motion-video cameras), personal digital assistants (PDAs), personal computers and mobile computers. Additionally, the present invention is not limited to a type of imaging unit which uses a zoom optical system though each of the above illustrated embodiments of the imaging units uses a zoom optical system including two movable lens groups disposed between two prisms.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. An imaging device comprising:
   an imaging optical system including at least one movable optical element;
   an image sensor, an imaging surface of which lies on an image-forming plane of said imaging optical system;
   a single circuit board having a planar and rectangular shape;
   an image processing circuit for processing an image signal output from said image sensor and a drive circuit for said movable optical element; and
   an actuator provided to drive the at least one movable optical element, said drive circuit configured to drive said actuator,
   wherein said image sensor, said image processing circuit and said drive circuit are mounted on said circuit board along a longitudinal direction thereof,
   wherein said image processing circuit and said drive circuit are disposed on said circuit board in that order from a side closer to said image sensor,
   wherein said movable optical element is movable in a direction of a primary optical axis of said imaging optical system,
   wherein said imaging optical system comprises an incident-side prism and an exit-side prism which are disposed at opposite ends of said primary optical axis to bend said opposite ends of said primary optical axis at right angles, respectively, and
   wherein said circuit board is parallel to said primary optical axis, includes said image sensor on a surface of said circuit board which faces an exit surface of said exit-side prism, and further includes said drive circuit so that said drive circuit is positioned in a close vicinity of said incident-side prism.

2. The imaging device according to claim 1, wherein a distance between said image processing circuit and said drive circuit on said circuit board is greater than a distance between said image sensor and said image processing circuit on said circuit board.

3. The imaging device according to claim 1, wherein said imaging optical system comprises a zoom optical system, and wherein said movable optical element is a lens group which moves along said primary optical axis to vary the focal length of said zoom optical system.

4. The imaging device according to claim 1, further comprising circuit parts disposed in an area of said circuit board between said image processing circuit and said drive circuit.

5. The imaging device according to claim 1, wherein said circuit board comprises a rigid board.

6. The imaging device according to claim 1, wherein said circuit board comprises a multi-layer wiring board.

7. The imaging device according to claim 1, wherein said image sensor and said drive circuit are disposed on said circuit board at opposite ends of said circuit board in a lengthwise direction thereof, respectively.

8. An imaging device including an imaging optical system and an image sensor, an imaging surface of said image sensor lying on an image-forming plane of said imaging optical system, said imaging optical system comprising:
   at least one movable optical element movable along a primary optical axis of said imaging optical system;
   an exit portion from which light passed through said movable optical element exits along an exit optical axis substantially orthogonal to said primary optical axis; and
   an actuator provided to drive the at least one movable optical element,
   wherein said image sensor is mounted on a single circuit board substantially parallel to said primary optical axis at one of opposite ends of said circuit board in a direction of said primary optical axis to face said exit portion of said imaging optical system, said circuit board having a planar and rectangular shape,
   wherein said imaging device further includes a drive circuit provided for said movable optical element, configured to drive said actuator and mounted on said circuit board at the other end of said opposite ends of said circuit board in said direction of said primary optical axis, and an image processing circuit provided for processing an image signal output from said image sensor and mounted on said circuit board between said image sensor and said drive circuit to be positioned closer to said image sensor than said drive circuit in said direction of said primary optical axis, and
   wherein said image sensor, said image processing circuit and said drive circuit are mounted on said circuit board along a longitudinal direction thereof.

9. The imaging device according to claim 8, wherein said circuit board comprises a rigid board.

10. The imaging device according to claim 8, wherein said circuit board comprises a multi-layer wiring board.

11. The imaging device according to claim 8, wherein said image sensor and said drive circuit are disposed on said circuit board at opposite ends of said circuit board in a lengthwise direction thereof, respectively.

* * * * *